(12) United States Patent
Miyake et al.

(10) Patent No.: US 9,799,906 B2
(45) Date of Patent: Oct. 24, 2017

(54) REDOX FLOW SECONDARY BATTERY AND ELECTROLYTE MEMBRANE FOR REDOX FLOW SECONDARY BATTERY

(71) Applicants: Asahi Kasei E-materials Corporation, Tokyo (JP); SUMITOMO ELECTRIC INDUSTRIES, LTD., Osaka (JP)

(72) Inventors: Naoto Miyake, Tokyo (JP); Kiyoaki Moriuchi, Osaka (JP); Michiru Kubata, Osaka (JP)

(73) Assignees: ASAHI KASEI KABUSHIKI KAISHA, Tokyo (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 350 days.

(21) Appl. No.: 14/367,059

(22) PCT Filed: Dec. 27, 2012

(86) PCT No.: PCT/JP2012/083944
§ 371 (c)(1),
(2) Date: Jun. 19, 2014

(87) PCT Pub. No.: WO2013/100079
PCT Pub. Date: Jul. 4, 2013

(65) Prior Publication Data
US 2014/0377687 A1    Dec. 25, 2014

(30) Foreign Application Priority Data
Dec. 28, 2011    (JP) ................................ 2011-290035

(51) Int. Cl.
*H01M 8/102*    (2016.01)
*C08F 14/18*    (2006.01)
(Continued)

(52) U.S. Cl.
CPC ............. *H01M 8/102* (2013.01); *C08F 14/18* (2013.01); *C08F 214/18* (2013.01);
(Continued)

(58) Field of Classification Search
CPC .......... H01M 8/102; H01M 8/18; H01M 8/02; H01M 8/1018; H01M 8/1039; H01M 8/188; H01M 8/1032; H01M 8/20
See application file for complete search history.

(56) References Cited

U.S. PATENT DOCUMENTS 4,421,579 A    12/1983 Covitch et al.
5,759,711 A     6/1998 Miyabayashi
(Continued)

FOREIGN PATENT DOCUMENTS

CN    101617427 A    12/2009
EP      2128919 A    12/2009
(Continued)

OTHER PUBLICATIONS

Orfino, The morphology of Nafion:are ion clusters bridged by channels or single ionic sites, Journal of New material for Electrochemical Systems, 3, 287-292(2000).*
(Continued)

*Primary Examiner* — Helen O Conley
(74) *Attorney, Agent, or Firm* — Greenblum & Bernstein, P.L.C.

(57) ABSTRACT

An object of the present invention is to provide a redox flow secondary battery being low in the electric resistance and excellent in the current efficiency as well, and further having the durability. The present invention relates to an electrolyte membrane for a redox flow secondary battery, the electrolyte membrane containing an ion-exchange resin composition containing a fluorine-based polyelectrolyte polymer, and having an ion cluster diameter of 1.00 to 2.95 nm as
(Continued)

measured in water at 25° C. by a small angle X-ray method, and to a redox flow secondary battery using the electrolyte membrane.

20 Claims, 1 Drawing Sheet

(51) Int. Cl.
C08F 214/18 (2006.01)
C08L 71/12 (2006.01)
C08L 81/02 (2006.01)
H01M 8/18 (2006.01)
H01M 8/02 (2016.01)
C08J 5/22 (2006.01)
H01M 8/1018 (2016.01)
H01M 8/1039 (2016.01)
H01M 8/1032 (2016.01)
H01M 8/20 (2006.01)
C08G 65/00 (2006.01)

(52) U.S. Cl.
CPC .......... *C08G 65/007* (2013.01); *C08J 5/2237* (2013.01); *C08L 71/12* (2013.01); *C08L 81/02* (2013.01); *H01M 8/02* (2013.01); *H01M 8/1018* (2013.01); *H01M 8/1032* (2013.01); *H01M 8/1039* (2013.01); *H01M 8/18* (2013.01); *H01M 8/188* (2013.01); *H01M 8/20* (2013.01); *C08J 2327/12* (2013.01); *H01M 2300/0082* (2013.01); *Y02E 60/528* (2013.01)

(56) References Cited

U.S. PATENT DOCUMENTS

| | | | |
|---|---|---|---|
| 6,461,772 | B1 | 10/2002 | Miyake et al. |
| 2004/0099527 | A1 | 5/2004 | Nakayama et al. |
| 2006/0063903 | A1 | 3/2006 | Kasahara et al. |
| 2006/0141315 | A1 | 6/2006 | Murata |
| 2007/0202377 | A1 | 8/2007 | Hommura et al. |
| 2008/0292964 | A1 | 11/2008 | Kazacos et al. |
| 2010/0015496 | A1 | 1/2010 | Miyake et al. |
| 2012/0045680 | A1 | 2/2012 | Dong et al. |
| 2012/0135278 | A1 | 5/2012 | Yoshie et al. |
| 2012/0178017 | A1 | 7/2012 | Murai et al. |
| 2013/0045400 | A1 | 2/2013 | Dong et al. |

FOREIGN PATENT DOCUMENTS

| | | |
|---|---|---|
| JP | S53-141187 A | 12/1978 |
| JP | S58-006988 A | 1/1983 |
| JP | S62-226580 A | 10/1987 |
| JP | H05-242905 A | 9/1993 |
| JP | H05-275108 A | 10/1993 |
| JP | H06-188005 A | 7/1994 |
| JP | H06-260183 A | 9/1994 |
| JP | H06-105615 B | 12/1994 |
| JP | H09-92321 A | 4/1997 |
| JP | H9-223513 A | 6/1997 |
| JP | H10-208767 A | 8/1998 |
| JP | H11-260390 A | 9/1999 |
| JP | 2000-235849 A | 8/2000 |
| JP | 2004-273255 A | 9/2004 |
| JP | 2005-158383 A | 6/2005 |
| JP | 2005-294171 A | 10/2005 |
| JP | 2006-059560 A | 3/2006 |
| JP | 2008-544444 A | 12/2008 |
| JP | 2009-057567 A | 3/2009 |
| JP | 2011-054315 A | 3/2011 |
| KR | 2009-0046087 A | 5/2009 |
| WO | 02-26883 A | 4/2002 |
| WO | 2005-103161 A1 | 11/2005 |
| WO | 2006-046620 A | 5/2006 |
| WO | 2010-143634 A1 | 12/2010 |
| WO | 2011-034179 A1 | 3/2011 |
| WO | 2011-111717 A1 | 9/2011 |

OTHER PUBLICATIONS

European search report issued with respect to application No. 12863252.8, mail date is May 8, 2015.
European Search Report issued for with respect to application No. 12861957.4 ,mail date is Jul. 28, 2015.
Klaus Schmidt-Rohr, Qiang Chen. Parallel cylindrical water Nanochannels in Nation fuel-cell membranes. Nature Materials. Jan. 2008, vol. 7, pp. 75-83.
International Search Report issued with respect to application No. PCT/JP2012/083944, mailing date is Feb. 12, 2013.
International preliminary report on patentability issued with respect to application No. PCT/JP2012/083944, mailing date is Feb. 12, 2013.
International search report issued with respect to application No. PCT/JP2012/083950, mailing date is Apr. 2, 2013.
International preliminary report on patentability issued with respect to application No. PCT/JP2012/083950, mailing date is Apr. 2, 2013.
International search report issued with respect to application No. PCT/JP2012/083961 mailing date is Feb. 12, 2013.
International preliminary report on patentability issued with respect to application No. PCT/JP2012/083961, mailing date is Feb. 12, 2013.
International search report issued with respect to application No. PCT/JP2012/083953 mailing date is Apr. 9, 2013.
International preliminary report on patentability issued with respect to application No. PCT/JP2012/083953, mailing date is Apr. 9, 2013.

* cited by examiner

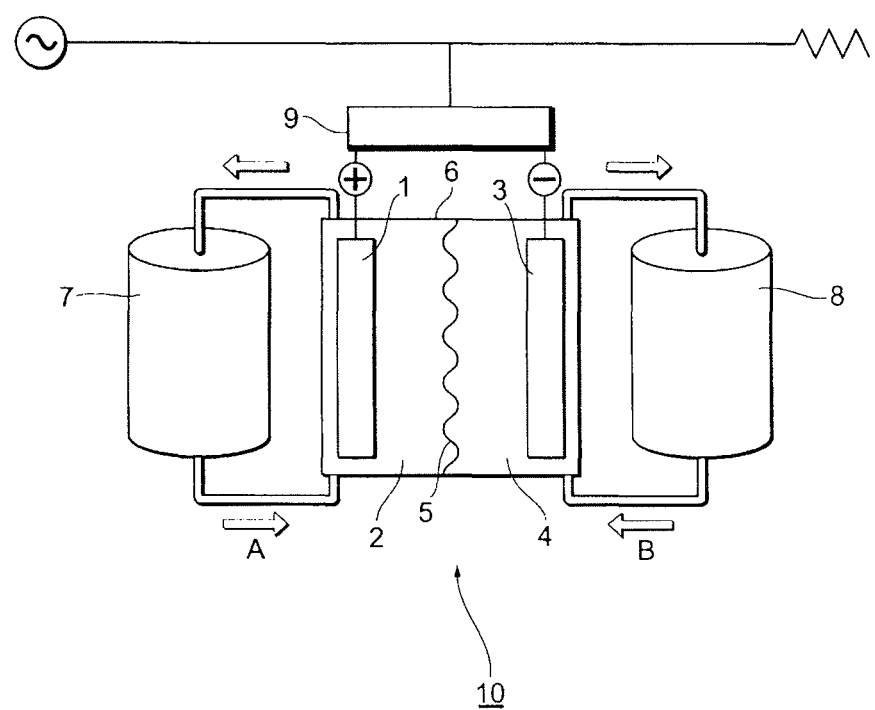

REDOX FLOW SECONDARY BATTERY AND ELECTROLYTE MEMBRANE FOR REDOX FLOW SECONDARY BATTERY

TECHNICAL FIELD

The present invention relates to a redox flow secondary battery, and an electrolyte membrane for a redox flow secondary battery.

BACKGROUND ART

Redox flow secondary batteries are to store and discharge electricity, and belong to large-size stationary batteries used for leveling the amounts of electricity used. The redox flow secondary battery is configured such that a positive electrode and an electrolyte solution containing a positive electrode active substance (positive electrode cell) and a negative electrode and a negative electrode electrolyte solution containing a negative electrode active substance (negative electrode cell) are separated by a separation membrane; charge and discharge are carried out by utilizing the oxidation and reduction reactions of both the active substances; and the electrolyte solutions including both the active substances are circulated from storage tanks to an electrolytic bath, and a current is taken out and utilized.

As an active substance contained in an electrolyte solution, there are used, for example, iron-chromium-based ones, chromium-bromine-based ones, zinc-bromine-based ones, and vanadium-based ones utilizing the difference in electric charge.

Particularly, vanadium-type secondary batteries, since having advantages of a high electromotive force, a high electrode reaction rate of vanadium ions, only a small amount of hydrogen generated as a side-reaction, a high output, and the like, are being developed earnestly.

For separation membranes, devices are made so that electrolyte solutions containing active substances of both electrodes are not mixed. However, conventional separation membranes are liable to be oxidized and for example a problem thereof is that the electric resistance needs to be made sufficiently low. Although in order to raise the current efficiency of batteries, the permeation of each active substance ion contained in the cell electrolyte solutions of both the electrodes (contamination with electrolytes in electrolyte solutions of both electrodes) is demanded to be prevented as much as possible, an ion-exchange membrane excellent in the ion permselectivity, in which protons ($H^+$) carrying the charge easily sufficiently permeate, is demanded.

The vanadium-type secondary battery utilizes an oxidation and reduction reaction of divalent vanadium ($V^{2+}$)/trivalent vanadium ($V^{3+}$) in a negative electrode cell, and an oxidation and reduction reaction of tetravalent vanadium ($V^{4+}$)/pentavalent vanadium ($V^{5+}$) in a positive electrode cell. Therefore, since electrolyte solutions of the positive electrode cell and the negative electrode cell contain ion species of the same metal, even if the electrolyte solutions are permeated through a separation membrane and mixed, the ion species are normally reproduced by charging; therefore, there hardly arises a large problem as compared with other metal species. However, since active substances becoming useless increase and the current efficiency decreases, it is preferable that the active substance ions freely permeate as little as possible.

There are conventionally batteries utilizing various types of separation membranes (hereinafter, also referred to as "electrolyte membrane" or simply "membrane"); and for example, batteries are reported which use porous membranes allowing free permeation by an ionic differential pressure and an osmotic pressure of electrolyte solutions as the driving force. For example, Patent Literature 1 discloses a polytetrafluoroethylene (hereinafter, also referred to as "PTFE") porous membrane, a polyolefin (hereinafter, also referred to as "PO")-based porous membrane, a PO-based nonwoven fabric, and the like as a separation membrane for a redox battery.

Patent Literature 2 discloses a composite membrane in combination of a porous membrane and a hydrous polymer for the purpose of the improvement of the charge and discharge energy efficiency of a redox flow secondary battery and the improvement of the mechanical strength of a separation membrane thereof.

Patent Literature 3 discloses the utilization of a membrane of a cellulose or an ethylene-vinyl alcohol copolymer as a nonporous hydrophilic polymer membrane excellent in the ion permeability and having a hydrophilic hydroxyl group for the purpose of the improvement of the charge and discharge energy efficiency of a redox flow secondary battery.

Patent Literature 4 states that the utilization of a polysulfone-based membrane (anion-exchange membrane) as a hydrocarbon-based ion-exchange resin makes the current efficiency of a vanadium redox secondary battery 80% to 88.5% and the radical oxidation resistance excellent.

Patent Literature 5 discloses a method of raising the reaction efficiency by making expensive platinum to be carried on a porous carbon of a positive electrode in order to raise the current efficiency of a redox flow secondary battery, and describes a Nafion (registered trademark) N117 made by Du Pont K.K. and a polysulfone-based ion-exchange membrane as a separation membrane in Examples.

Patent Literature 6 discloses an iron-chromium-type redox flow battery in which a hydrophilic resin is coated on pores of a porous membrane of a polypropylene (hereinafter, also referred to as "PP") or the like. An Example of the Patent Literature uses a membrane covered in a thickness of several micrometers with a fluorine-based ion-exchange resin (made by Du Pont K.K., registered trademark: Nafion) on both surfaces of a PP porous membrane of 100 μm in thickness. Here, Nafion is a copolymer containing a repeating unit represented by —($CF_2$—$CF_2$)— and a repeating unit represented by —($CF_2$—CF(—O—($CF_2CFXO)_n$—($CF_2)_m$—$SO_3H$))— wherein X=$CF_3$, n=1, and m=2.

Patent Literature 7 discloses an example of a vanadium-type redox flow secondary battery decreased in the cell electric resistance as much as possible and raised in the efficiency by the improvement of the electrode sides including the usage of a two-layer liquid-permeable porous carbon electrode having a specific lattice plane.

Patent Literature 8 discloses an example of a vanadium-type redox flow battery using an anion-exchange type separation membrane having a low membrane resistance, being excellent in the proton permeability and the like, and being composed of a crosslinked polymer having a pyridinium group (utilizing $N^+$ as a cation). The crosslinked polymer disclosed is a polymer obtained by copolymerizing a pyridinium group-containing vinyl polymerizable monomer, a styrene-based monomer and the like, and a crosslinking agent such as divinylbenzene.

Patent Literature 9 discloses a redox flow secondary battery using a separation membrane which is made by alternately laminating a cation-exchange membrane (fluorine-based polymer or another hydrocarbon-based polymer) and an anion-exchange membrane (polysulfone-based polymer or the like), and which has a cation-exchange membrane disposed on the side of the separation membrane contacting with a positive electrode electrolyte solution, for the purpose of reducing the cell resistance and improving the power efficiency and the like.

Patent Literature 10 discloses a secondary battery using as a separation membrane a membrane excellent in the chemical resistance, low in the resistance, and excellent in the ion permselectivity, which is an anion-exchange membrane made by compositing a porous base material composed of a porous PTFE-based resin with a crosslinked polymer having a repeating unit of a vinyl heterocyclic compound having two or more hydrophilic groups (vinylpyrrolidone having an amino group, or the like). The principle described therein is that although metal cations, having a large ion diameter and a much amount of electric charge, receive an electric repulsion by cations of a separation membrane surface layer part and are inhibited from the membrane permeation under the potential difference application, protons ($H^+$), having a small ion diameter and being monovalent can easily diffuse and permeate in the separation membrane having cations to thereby give a low electric resistance.

CITATION LIST

Patent Literature

Patent Literature 1: Japanese Patent Laid-Open No. 2005-158383
Patent Literature 2: Japanese Patent Publication No. H6
Patent Literature 3: Japanese Patent Laid-Open No. S62-226580
Patent Literature 4: Japanese Patent Laid-Open No. H6-188005
Patent Literature 5: Japanese Patent Laid-Open No. H5-242905
Patent Literature 6: Japanese Patent Laid-Open No. H6-260183
Patent Literature 7: Japanese Patent Laid-Open No. H9-92321
Patent Literature 8: Japanese Patent Laid-Open No. H10-208767
Patent Literature 9: Japanese Patent Laid-Open No. H11-260390
Patent Literature 10: Japanese Patent Laid-Open No. 2000-235849

SUMMARY OF INVENTION

Technical Problem

However, since the battery disclosed in Patent Literature 1 is not sufficient in the electric resistance and the ion permselectivity of the separation membrane, it is insufficient in the current efficiency, the durability, and the like.

The composite membrane disclosed in Patent Literature 2 has a high electric resistance, and a problem thereof is that each ion freely diffuses though not so easily as in porous membranes to thereby give a poor battery current efficiency. The membrane disclosed in Patent Literature 3 also has the similar problem as in the above, and is inferior also in the oxidation-resistant durability.

The battery disclosed in Patent Literature 4 is yet insufficient in the current efficiency, inferior also in the oxidative deterioration resistance in a sulfuric acid electrolyte solution over a long period, and insufficient also in the durability. The Patent Literature, although disclosing a battery using a PTFE-based ion-exchange membrane as a comparative example, states that the current efficiency is 64.8 to 78.6% and insufficient.

The battery disclosed in Patent Literature 5 also cannot solve the similar problem as in the above, and a problem thereof is that the large-size facility is resultantly high in price.

Patent Literature 6 states that the membrane disclosed therein increases in the internal resistance unless the thickness of a coated membrane is made extremely thin (several micrometers). No devices to improve the ion permselectivity are described at all.

The battery disclosed in Patent Literature 7, since using a polysulfone-based separation membrane, is not sufficient in the ion permselectivity and the oxidative deterioration resistance of the separation membrane, and is not sufficient in the electric resistance, the current efficiency, and the durability of the battery.

The battery disclosed in Patent Literature 8 is insufficient in the current efficiency, and has a problem with the long-term usage because of oxidative deterioration.

A problem of the membrane disclosed in Patent Literature 9 is that the electric resistance is high.

The result shown in an Example of Patent Literature 10 cannot be said to exhibit a sufficiently low internal resistance (electric resistance) of the membrane, and has the problem of the oxidative deterioration resistance in the long-term usage.

Electrolyte membranes (separation membranes) for conventional vanadium-type redox flow batteries are used for the purpose of suppressing the diffusion, migration, and permeation of active substance ions to counter electrodes (cells), and allowing protons ($H^+$) to selectively permeate along with the operation of charge and discharge as the purpose, in each of a cell (negative electrode side) in which ions of a low-valent group of vanadium ions, which are active substances of electrolyte solutions of both electrodes, hold a large majority, and a cell (positive electrode side) in which ions of a high-valent group of the vanadium ions hold a large majority. However, the performance cannot be said to be sufficient at present.

As a membrane base material composed mainly of a hydrocarbon-based resin, there are used a porous membrane which only simply separates electrolyte solutions containing electrolytes as principal parts of both cells and exhibits no ion permselectivity, a (nonporous) hydrophilic membrane base material exhibiting no ion permselectivity, a porous membrane having a hydrophilic membrane base material embedded therein or covered thereon, and the like. There are also used as a separation membrane a so-called cation-exchange membrane in which the membrane itself has various types of anion groups, or a composite membrane in which a cation-exchange resin is covered on or embedded in pores of a porous membrane base material, an anion-exchange membrane in which the membrane itself similarly has cation groups, or a composite membrane in which an anion-exchange resin is similarly covered on or embedded in a porous membrane base material, a membrane of a laminate type of both, and the like; and studies making the most of respective features are being carried out.

No ion-exchange resin separation membrane as the separation membrane has been developed so far which sufficiently satisfies two contrary performances of the electric resistance (depending mainly on the proton permeability) and the permeability inhibition of metal ions (polyvalent cations), which are active substances as the principal parts, and further no ion-exchange resin separation membrane has been developed so far which satisfies, in addition to the above two performances, the oxidative deterioration resistance (hydroxy radical resistance) over a long period. Also for fluorine-based ion-exchange resins, no sufficient studies of devices have been made on mutually contradictory properties of the excellent proton ($H^+$) permeability and the inhibition of the active substance ion permeation; and no redox flow battery and no electrolyte membrane therefor have been developed which sufficiently satisfy a low electric resistance, a high current efficiency, the oxidative deterioration resistance (hydroxy radical resistance), and the like.

In consideration of the above-mentioned situation, it is an object of the present invention to provide a redox flow secondary battery being low in the electric resistance and excellent in the current efficiency, and further having the durability; and it is an object of the present invention to provide an electrolyte membrane for a redox flow secondary battery having the excellent ion permselectivity capable of suppressing the active substance ion permeability without deteriorating the proton ($H^+$) permeability, and further having the oxidative deterioration resistance (hydroxy radical resistance) as well.

Solution to Problem

As a result of exhaustive studies to solve the above-mentioned problems, the present inventors have found that an electrolyte membrane having the excellent ion permselectivity and further being excellent in the oxidative deterioration resistance (hydroxy radical resistance) as well can be provided by incorporating a fluorine-based polyelectrolyte polymer having a specific structure and further regulating the ion cluster diameter of the membrane in a specific range, and have found that a redox flow secondary battery low in the electric resistance, excellent in the current efficiency, and excellent further in the durability can be provided by using the electrolyte membrane as a separation membrane. These findings have led to the completion of the present invention.

That is, the present invention is as follows.

[1]

A redox flow secondary battery comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a separation membrane to separate the positive electrode cell chamber and the negative electrode cell chamber, wherein the positive electrode cell chamber comprises a positive electrode electrolyte solution comprising a positive electrode active substance; and the negative electrode cell chamber comprises a negative electrode electrolyte solution comprising a negative electrode active substance;

wherein the redox flow secondary battery charges and discharges based on changes in valences of the positive electrode active substance and the negative electrode active substance in the electrolyte solutions;

wherein the electrolyte membrane comprises an ion-exchange resin composition comprising a fluorine-based polyelectrolyte polymer having a structure represented by the following formula (1):

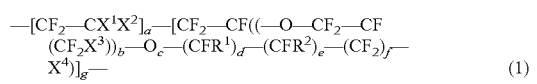
(1)

wherein $X^1$, $X^2$, and $X^3$ each independently represent one or more selected from the group consisting of halogen atoms and perfluoroalkyl groups having 1 to 3 carbon atoms; $X^4$ represents COOZ, $SO_3Z$, $PO_3Z_2$, or $PO_3HZ$ wherein Z represents a hydrogen atom, an alkali metal atom, an alkaline earth metal atom, or an amine ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \le a < 1$, $0 < g \le 1$, and $a+g=1$, b represents an integer of 0 to 8, c represents 0 or 1, and d, e, and f each independently represent an integer of 0 to 6 (with the proviso that d, e, and f are not 0 at the same time); and wherein the electrolyte membrane has an ion cluster diameter of 1.00 to 2.95 nm as measured in water at 25° C. by a small angle X-ray method.

[2]

The redox flow secondary battery according to above [1], wherein sulfuric acid electrolyte solutions comprising vanadium are used as the positive electrode electrolyte solution and the negative electrode electrolyte solution.

[3]

The redox flow secondary battery according to above [1] or [2], wherein the fluorine-based polyelectrolyte polymer is a perfluorocarbonsulfonic acid resin (PFSA) having a structure represented by the following formula (2):

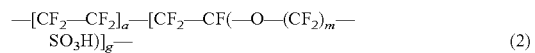
(2)

wherein a and g represent numbers satisfying $0 \le a < 1$, $0 < g \le 1$, and $a+g=1$; and m represents an integer of 1 to 6.

[4]

The redox flow secondary battery according to any one of above [1] to [3], wherein the fluorine-based polyelectrolyte polymer has an equivalent weight EW (dry mass in grams per equivalent of ion-exchange groups) of 300 to 1,300 g/eq; and the electrolyte membrane has an equilibrium moisture content of 5 to 80% by mass.

[5]

The redox flow secondary battery according to any one of [1] to [4], wherein the ion-exchange resin composition comprises 0.1 to 200 parts by mass of a polyazole-based compound with respect to 100 parts by mass of the fluorine-based polyelectrolyte polymer.

[6]

The redox flow secondary battery according to the above [5], wherein the polyazole-based compound is one or more selected from the group consisting of polymers of a heterocyclic compound having one or more nitrogen atoms in a ring thereof, and polymers of a heterocyclic compound having one or more nitrogen atoms and oxygen and/or sulfur in a ring thereof.

[7]

The redox flow secondary battery according to the above [6], wherein the polyazole-based compound is one or more selected from the group consisting of polyimidazole-based compounds, polybenzimidazole-based compounds, polybenzobisimidazole-based compounds, polybenzoxazole-based compounds, polyoxazole-based compounds, polythiazole-based compounds, and polybenzothiazole-based compounds.

[8]
The redox flow secondary battery according to any one of the above [5] to [7], wherein the fluorine-based polyelectrolyte polymer and the polyazole-based compound at least partially form an ionic bond therebetween.

[9]
The redox flow secondary battery according to any one of above [1] to [8], further comprising 0.1 to 20 parts by mass of a polyphenylene ether resin and/or a polyphenylene sulfide resin with respect to 100 parts by mass of the fluorine-based polyelectrolyte polymer.

[10]
The redox flow secondary battery according to any one of the above [1] to [9], comprising 50 to 100 parts by mass of the fluorine-based polyelectrolyte polymer with respect to 100 parts by mass of the ion-exchange resin composition.

[11]
An electrolyte membrane for a redox flow secondary battery, comprising an ion-exchange resin composition comprising a fluorine-based polyelectrolyte polymer having a structure represented by the following formula (1):

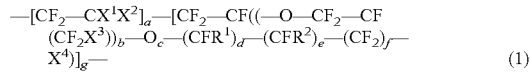

$$—[CF_2—CX^1X^2]_a—[CF_2—CF((—O—CF_2—CF(CF_2X^3))_b—O_c—(CFR^1)_d—(CFR^2)_e—(CF_2)_f—X^4)]_g— \quad (1)$$

wherein $X^1$, $X^2$, and $X^3$ each independently represent one or more selected from the group consisting of halogen atoms and perfluoroalkyl groups having 1 to 3 carbon atoms; $X^4$ represents COOZ, $SO_3Z$, $PO_3Z_2$, or $PO_3HZ$ wherein Z represents a hydrogen atom, an alkali metal atom, an alkaline earth metal atom, or an amine ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \leq a < 1$, $0 < g \leq 1$, and $a+g=1$, b represents an integer of 0 to 8, c represents 0 or 1, and d, e, and f each independently represent an integer of 0 to 6 (with the proviso that d, e, and f are not 0 at the same time); and wherein the electrolyte membrane has an ion cluster diameter of 1.00 to 2.95 nm as measured in water at 25° C. by a small angle X-ray method.

[12]
The electrolyte membrane for the redox flow secondary battery according to above [11], wherein the fluorine-based polyelectrolyte polymer is a perfluorocarbonsulfonic acid resin having a structure represented by the following formula (2):

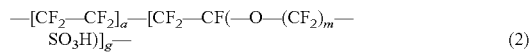

$$—[CF_2—CF_2]_a—[CF_2—CF(—O—(CF_2)_m—SO_3H)]_g— \quad (2)$$

wherein a and g represent numbers satisfying $0 \leq a < 1$, $0 < g \leq 1$, and $a+g=1$; and m represents an integer of 1 to 6.

[13]
The electrolyte membrane for the redox flow secondary battery according to above [11] or [12], wherein the fluorine-based polyelectrolyte polymer has an equivalent weight EW (dry mass in grams per equivalent of ion-exchange groups) of 300 to 1,300; and the electrolyte membrane has an equilibrium moisture content of 5 to 80% by mass.

[14]
The electrolyte membrane for the redox flow secondary battery according to any one of the above [11] to [13], wherein the ion-exchange resin composition comprises 0.1 to 200 parts by mass of a polyazole-based compound with respect to 100 parts by mass of the fluorine-based polyelectrolyte polymer.

[15]
The electrolyte membrane for the redox flow secondary battery according to the above [14], wherein the polyazole-based compound is one or more selected from the group consisting of polymers of a heterocyclic compound having one or more nitrogen atoms in a ring thereof, and polymers of a heterocyclic compound having one or more nitrogen atoms and oxygen and/or sulfur in a ring thereof.

[16]
The electrolyte membrane for the redox flow secondary battery according to the above [15], wherein the polyazole-based compound is one or more selected from the group consisting of polyimidazole-based compounds, polybenzimidazole-based compounds, polybenzobisimidazole-based compounds, polybenzoxazole-based compounds, polyoxazole-based compounds, polythiazole-based compounds, and polybenzothiazole-based compounds.

[17]
The electrolyte membrane for the redox flow secondary battery according to any one of the above [14] to [16], wherein the fluorine-based polyelectrolyte polymer and the polyazole-based compound at least partially form an ionic bond therebetween.

[18]
The electrolyte membrane for the redox flow secondary battery according to any one of the above [11] to [17], further comprising 0.1 to 20 parts by mass of a polyphenylene ether resin and/or a polyphenylene sulfide resin with respect to 100 parts by mass of the fluorine-based polyelectrolyte polymer.

[19]
The electrolyte membrane for the redox flow secondary battery according to any one of above [11] to [18], wherein the electrolyte membrane is subjected to a heat treatment at 130 to 200° C. for 1 to 60 min.

[20]
The electrolyte membrane for the redox flow secondary battery according to any one of the above [11] to [19], further comprising a reinforcing material.

[21]
The electrolyte membrane for the redox flow secondary battery according to any one of the above [11] to [20], comprising 50 to 100 parts by mass of the fluorine-based polyelectrolyte polymer with respect to 100 parts by mass of the ion-exchange resin composition.

Advantageous Effects of Invention

The redox flow secondary battery according to the present invention is low in the electric resistance and high in the current efficiency, and can further suppress the elimination of ion groups, the collapse phenomenon of a polyelectrolyte, and the like as compared with redox flow secondary batteries using a hydrocarbon-based electrolyte as a separation membrane, and is excellent in the durability.

Since the electrolyte membrane for a redox flow secondary battery according to the present invention has excellent ion permselectivity, is excellent in the high proton ($H^+$) permeability and the permeation inhibition of active substance ions in electrolyte solutions, and is further excellent in the oxidative deterioration resistance (hydroxy radical resistance) over a long period, the use of the electrolyte membrane as a separation membrane of a redox flow secondary battery can provide the redox flow secondary battery low in the cell electric resistance and high in the current efficiency; and since the electrolyte membrane exhibits a high oxidative deterioration prevention effect to hydroxy radicals generated in electrolyte solution cells in a system over a long period, the electrolyte membrane can suppress the elimination of ion groups, the collapse phenomenon of the polyelectrolyte, and the like, which are caused in the case of using usual hydrocarbon-based electrolytes.

BRIEF DESCRIPTION OF DRAWING

FIG. 1 shows an example of a schematic diagram of a redox flow secondary battery in the present embodiments.

DESCRIPTION OF EMBODIMENTS

Hereinafter, embodiments to carry out the present invention (hereinafter, referred to as "present embodiments") will be described in detail. The present invention is not limited to the following present embodiments.
[Redox Flow Secondary Battery]
A redox flow secondary battery in the present embodiment, comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a separation membrane to separate the positive electrode cell chamber and the negative electrode cell chamber, wherein the positive electrode cell chamber comprises a positive electrode electrolyte solution comprising a positive electrode active substance; and the negative electrode cell chamber comprises a negative electrode electrolyte solution comprising a negative electrode active substance;

wherein the redox flow secondary battery charges and discharges based on changes in valences of the positive electrode active substance and the negative electrode active substance in the electrolyte solutions;

wherein the electrolyte membrane comprises an ion-exchange resin composition comprising a fluorine-based polyelectrolyte polymer having a structure represented by the following formula (1):

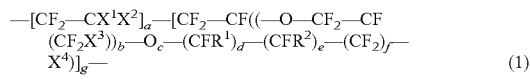

(1)

wherein $X^1$, $X^2$, and $X^3$ each independently represent one or more selected from the group consisting of halogen atoms and perfluoroalkyl groups having 1 to 3 carbon atoms; $X^4$ represents $COOZ$, $SO_3Z$, $PO_3Z_2$, or $PO_3HZ$ wherein Z represents a hydrogen atom, an alkali metal atom, an alkaline earth metal atom, or an amine ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \leq a < 1$, $0 < g \leq 1$, and $a+g=1$, b represents an integer of 0 to 8, c represents 0 or 1, and d, e, and f each independently represent an integer of 0 to 6 (with the proviso that d, e, and f are not 0 at the same time); and wherein the electrolyte membrane has an ion cluster diameter of 1.00 to 2.95 nm as measured in water at 25° C. by a small angle X-ray method.

FIG. 1 shows an example of a schematic diagram of a redox flow secondary battery in the present embodiment. A redox flow secondary battery 10 in the present embodiment has an electrolytic bath 6 which comprises a positive electrode cell chamber 2 comprising a positive electrode 1 composed of a carbon electrode, a negative electrode cell chamber 4 comprising a negative electrode 3 composed of a carbon electrode, and an electrolyte membrane 5 as a separation membrane to separate the positive electrode cell chamber 2 and the negative electrode cell chamber 4, wherein the positive electrode cell chamber 2 contains a positive electrode electrolyte solution comprising a positive electrode active substance; and the negative electrode cell chamber 4 contains a negative electrode electrolyte solution comprising a negative electrode active substance. The positive electrode electrolyte solution and the negative electrode electrolyte solution comprising the active substances are, for example, stored in a positive electrode electrolyte solution tank 7 and a negative electrode electrolyte solution tank 8, and fed to respective cell chambers by pumps or the like (arrows A, B). The current generated by the redox flow secondary battery may be converted from direct current to alternating current through an AC/DC converter 9.

The redox flow secondary battery in the present embodiment has a structure in which each of liquid-permeable porous current collector electrodes (for the negative electrode and for the positive electrode) is disposed on either side of the separation membrane, and these are held by pressing; one side partitioned by the separation membrane is made the positive electrode cell chamber and the other side is made the negative electrode cell chamber; and the thicknesses of both the cell chambers are secured by spacers.

In the case of a vanadium-type redox flow secondary battery, the charge and discharge of the battery is carried out by circulating the positive electrode electrolyte solution composed of a sulfuric acid electrolyte solution comprising tetravalent vanadium ($V^{4+}$) and pentavalent vanadium ($V^{5+}$) to the positive electrode cell chamber, and circulating the negative electrode electrolyte solution comprising trivalent vanadium ($V^{3+}$) and divalent vanadium ($V^{2+}$) to the negative electrode cell chamber. In the charge time therein, in the positive electrode cell chamber, vanadium ions release electrons to thereby oxidize $V^{4+}$ to $V^{5+}$; and in the negative electrode cell chamber, electrons having returned through an external circuit reduce $V^{3+}$ to $V^{2+}$. In the oxidation and reduction reactions, in the positive electrode cell chamber, protons ($H^+$) become excessive; by contrast, in the negative electrode cell chamber, protons ($H^+$) become insufficient. The excessive protons in the positive electrode cell chamber selectively migrate to the negative electrode chamber through the separation membrane to thereby hold the electric neutrality. In the discharge time, a reaction reverse thereto progresses. The battery efficiency (%) at this time is represented by a ratio (%) obtained by dividing a discharge electric energy by a charge electric energy; and both the electric energies depend on the internal resistance of the battery cells, the ion permselectivity of the separation membrane, and the current losses of others. Since the reduction of the internal resistance improves the voltage efficiency, and the improvement of the ion permselectivity and the reduction of the current losses of others improve the current efficiency, these factors become important indices in the redox flow secondary battery.

[Electrolyte Membrane for a Redox Flow Secondary Battery]

An electrolyte membrane for a redox flow secondary battery according to the present embodiment comprises an ion-exchange resin composition comprising a fluorine-based polyelectrolyte polymer having a specific structure, and has a specific ion cluster diameter. Thereby, the electrolyte membrane is excellent in the ion permselectivity.

<Ion-Exchange Resin Composition>

In the present embodiment, the ion-exchange resin composition comprises a fluorine-based polyelectrolyte polymer having a structure represented by the above formula (1).

(Fluorine-Based Polyelectrolyte Polymer)

In the present embodiment, the fluorine-based polyelectrolyte polymer has a structure represented by the following formula (1).

A fluorine-based polyelectrolyte polymer in the present embodiment is not especially limited as long as having a structure represented by the following formula (1), and may comprise other structures.

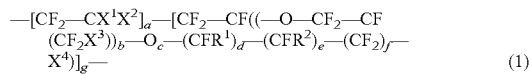

$$-[CF_2-CX^1X^2]_a-[CF_2-CF((-O-CF_2-CF(CF_2X^3))_b-O_c-(CFR^1)_d-(CFR^2)_e-(CF_2)_f-X^4)]_g- \quad (1)$$

wherein $X^1$, $X^2$, and $X^3$ each independently represent one or more selected from the group consisting of halogen atoms and perfluoroalkyl groups having 1 to 3 carbon atoms; $X^4$ represents COOZ, $SO_3Z$, $PO_3Z_2$, or $PO_3HZ$ wherein Z represents a hydrogen atom, an alkali metal atom, an alkaline earth metal atom, or an amine ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \leq a < 1$, $0 < g \leq 1$, and a+g=1, b represents an integer of 0 to 8, c represents 0 or 1, and d, e, and f each independently represent an integer of 0 to 6 (with the proviso that d, e, and f are not 0 at the same time).

$X^1$, $X^2$, and $X^3$ each independently represent one or more selected from the group consisting of halogen atoms and perfluoroalkyl groups having 1 to 3 carbon atoms. Here, the halogen atoms include a fluorine atom, a chlorine atom, a bromine atom, and an iodine atom. $X^1$, $X^2$, and $X^3$, from the viewpoint of the chemical stability such as the oxidative deterioration resistance of the polymer, are preferably each a fluorine atom or a perfluoroalkyl group having 1 to 3 carbon atoms.

$X^4$ represents COOZ, $SO_3Z$, $PO_3Z_2$, or $PO_3HZ$. Hereinafter, $X^4$ is also referred to as an "ion-exchange group." Z represents a hydrogen atom, an alkali metal atom, an alkaline earth metal atom, or an amine ($NH_4$, $NH_3R_1$, $NH_2R_1R_2$, $NHR_1R_2R_3$, $NR_1R_2R_3R_4$). Here, the alkali metal atom is not especially limited, and includes a lithium atom, a sodium atom, and a potassium atom. The alkaline earth metal atom is not especially limited, and includes a calcium atom and a magnesium atom. $R_1$, $R_2$, $R_3$, and $R_4$ each independently represent one or more selected from the group consisting of alkyl groups and arene groups. Here, in the case where $X^4$ is $PO_3Z_2$, Z may be identical or different. $X^4$, from the viewpoint of the chemical stability including the oxidative deterioration resistance of the polymer, is preferably $SO_3Z$.

$R^1$ and $R^2$ each independently represent one or more selected from the group consisting of halogen atoms and perfluoroalkyl groups and fluorochloroalkyl groups having 1 to 10 carbon atoms. Here, the halogen atoms include a fluorine atom, a chlorine atom, a bromine atom, and an iodine atom.

a and g represent numbers satisfying $0 \leq a < 1$, $0 < g \leq 1$, and a+g=1. b represents an integer of 0 to 8. c represents 0 or 1. d, e, and f each independently represent an integer of 0 to 6. Here, d, e, and f are not 0 at the same time.

The fluorine-based polyelectrolyte polymer in the present embodiment is preferably a perfluorocarbonsulfonic acid resin (hereinafter, also referred to as "PFSA resin") because of giving a tendency of making the advantage of the present invention more remarkable. The PFSA resin in the present embodiment is a resin in which perfluorocarbons as side chains are bonded to the main chain composed of a PTFE skeleton chain, and one or two or more sulfonic acid groups (as the case may be, a part of the groups may be a form of a salt) are bonded to the each side chain.

The PFSA resin preferably comprises a repeating unit represented by $-(CF_2-CF_2)-$ and a repeating unit derived from a compound represented by the following formula (3) or (4), and is further preferably composed of a repeating unit represented by $-(CF_2-CF_2)-$ and a repeating unit derived from a compound represented by the formula (3) or (4).

Formula (3): $CF_2=CF(-O-(CF_2CFXO)_n-[A])$ wherein X represents F or a perfluoroalkyl group having 1 to 3 carbon atoms; n represents an integer of 0 to 5; and [A] is $(CF_2)_m-SO_3H$ wherein m represents an integer of 1 to 6, here, n and m are not 0 at the same time, or Formula (4): $CF_2=CF-O-(CF_2)_P-CFX(-O-(CF_2)_K-SO_3H)$ or $CF_2=CF-O-(CF_2)_P-CFX(-(CF_2)_L-O-(CF_2)_m-SO_3H)$ wherein X represents a perfluoroalkyl group having 1 to 3 carbon atoms; and P represents an integer of 0 to 12, K represents an integer of 1 to 5, L represents an integer of 1 to 5, and m represents an integer of 0 to 6, here, K and L may be identical or different, and P, K, and L are not 0 at the same time.

The PFSA resin is a copolymer comprising a repeating unit represented by $-(CF_2-CF_2)-$ and a repeating unit represented by $-(CF_2-CF(-O-(CF_2CFXO)_n-(CF_2)_m-SO_3H))-$ wherein X represents F or $CF_3$; and n represents an integer of 0 to 5, and m represents an integer of 0 to 12, here, n and m are not 0 at the same time, and is more preferably a copolymer necessarily comprising a repeating unit represented by $-(CF_2-CF(-O-(CF_2CFXO)_n-(CF_2)_m-SO_3H))-$ wherein X represents $CF_3$; and n represents 0 or 1, and m represents an integer of 0 to 12, here, n and m are not 0 at the same time. The case where the PFSA resin is a copolymer having the above structure and has a predetermined equivalent weight EW has such tendencies that an obtained electrolyte membrane exhibits sufficient hydrophilicity, and the resistance to radical species generated by oxidative deterioration becomes high.

The case where the PFSA resin comprises the repeating unit of $-(CF_2-CF(-O-(CF_2CFXO)_n-(CF_2)_m-SO_3H))-$ wherein n is 0 and m is an integer of 1 to 6, or both the repeating units of $-CF_2-CFX(-O-(CF_2)_P-CFX(-O-(CF_2)_K-SO_3H)-$ and $-CF_2-CFX(-O-(CF_2)_P-CFX(-O-(CF_2)_L-O-(CF_2)_m-SO_3H)-$ represented by the formula (4) has further such tendencies that the equivalent weight EW becomes low and the hydrophilicity of an obtained electrolyte membrane becomes high.

In the copolymer, of Nafion (registered trademark of Du Pont K.K.) which is a fluorine-based resin used in the conventional technology, containing a repeating unit represented by $-(CF_2-CF_2)-$ and a repeating unit of $-(CF_2-CF(-O-(CF_2CFXO)_n-(CF_2)_m-SO_3H))-$, it is known that $X=CF_3$, n=1 and m=2; and the EW described later is 893 to 1,030.

It has been found as a result of studies by the present inventors that in the case where a PFSA resin is used as an electrolyte membrane for a redox flow secondary battery, the PFSA resin comprising the repeating unit represented by —(CF$_2$—CF(—O— (CF$_2$CFXO)$_n$—(CF$_2$)$_m$—SO$_3$H))— wherein n is 0 and m is an integer of 1 to 6, or both the repeating units of —CF$_2$—CF(—O— (CF$_2$)$_P$—CFX(—O—(CF$_2$)$_K$—SO$_3$H)— and —CF$_2$—CF(—O—(CF$_2$)$_P$—CFX(—(CF$_2$)$_L$—O—(CF$_2$)$_m$—SO$_3$H)— represented by the formula (4) has such tendencies that the hydrophilicity and the ion permselectivity are excellent, and the electric resistance of an obtained redox flow secondary battery is low and the current efficiency thereof is improved, as compared with the above Nafion.

The fluorine-based polyelectrolyte polymer represented by the formula (1) in the present embodiment is preferably a PFSA resin having a structure represented by the following formula (2) because of giving a tendency of making the advantage of the present invention more remarkable.

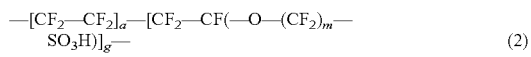
$$\text{—[CF}_2\text{—CF}_2]_a\text{—[CF}_2\text{—CF(—O—(CF}_2)_m\text{—SO}_3\text{H)]}_g\text{—} \quad (2)$$

wherein a and g represent numbers satisfying 0≤a<1, 0<g≤1, and a+g=1; m represents an integer of 1 to 6.

The fluorine-based polyelectrolyte polymer represented by the above formula (1) and the PFSA resin having a structure represented by the above formula (2) in the present embodiment, respectively, are not especially limited as long as having the structures represented by the above formula (1) and the above formula (2), and may comprise other structures.

The fluorine-based polyelectrolyte polymer represented by the above formula (1) and the PFSA resin having a structure represented by the above formula (2) in the present embodiment may be those in which a part of ion-exchange groups is subjected to intermolecular direct or indirect partial crosslinking reaction. The partial crosslinking is preferable from the viewpoint of being able to control the solubility and the excessive swell.

For example, even if the EW of a fluorine-based polyelectrolyte polymer is about 280, by carrying out the above partial crosslinking, the solubility of the fluorine-based polyelectrolyte polymer to water can be reduced (the water resistance can be improved).

Also in the case where a fluorine-based polyelectrolyte polymer is in a low melt flow region (polymer region), the above partial crosslinking can increase intermolecular entanglement and reduce the solubility and the excessive swell.

Examples of the partial crosslinking reaction include a reaction of an ion-exchange group with a functional group or the main chain of another molecule, a reaction of ion-exchange groups, and a crosslinking reaction (covalent bond) through an oxidation-resistant low molecular compound, oligomer, polymeric substance, or the like, and as the case may be, a reaction with a substance to form a salt (including an ionic bond with a SO$_3$H group). Examples of the oxidation-resistant low molecular compound, oligomer, and polymeric substance include polyhydric alcohols and organic diamines.

The molecular weight of a fluorine-based polyelectrolyte polymer in the present embodiment is not especially limited, but is, in terms of a value of a melt flow index (MFI) measured according to ASTM: D1238 (measurement conditions: a temperature of 270° C. and a load of 2,160 g), preferably 0.05 to 50 (g/10 min), more preferably 0.1 to 30 (g/10 min), and still more preferably 0.5 to 20 (g/10 min).

(Equivalent Weight EW of a Fluorine-Based Polyelectrolyte Polymer)

The equivalent weight EW (dry mass in grams of a fluorine-based polyelectrolyte polymer per equivalent weight of an ion-exchange group) of the fluorine-based polyelectrolyte polymer in the present embodiment is preferably 300 to 1,300 (g/eq), more preferably 350 to 1,000 (g/eq), still more preferably 400 to 900 (g/eq), and especially preferably 450 to 750 (g/eq).

In a fluorine-based polyelectrolyte polymer having a structure of the above formula (1), by regulating the equivalent weight EW thereof in the above range, an ion-exchange resin composition containing the polymer can be imparted with excellent hydrophilicity; and an electrolyte membrane obtained by using the resin composition results in having a lower electric resistance and a higher hydrophilicity, and having a large number of smaller clusters (minute moieties where ion-exchange groups coordinate and/or adsorb water molecules), and gives such a tendency that the oxidation resistance (hydroxy radical resistance) and the ion permselectivity are more improved.

The equivalent weight EW of a fluorine-based polyelectrolyte polymer is preferably 300 or higher from the viewpoint of the hydrophilicity and the water resistance of the membrane; and that is preferably 1,300 or lower from the viewpoint of the hydrophilicity and the electric resistance of the membrane.

The equivalent weight EW of a fluorine-based polyelectrolyte polymer can be measured by replacing the fluorine-based polyelectrolyte polymer by a salt, and back-titrating the solution with an alkali solution.

The equivalent weight EW can be regulated by selecting copolymerization ratios of fluorine-based monomers as raw materials of a fluorine-based polyelectrolyte polymer, kinds of the monomers, and the like.

(Method for Producing a Fluorine-Based Polyelectrolyte Polymer)

A fluorine-based polyelectrolyte polymer in the present embodiment can be obtained, for example, by producing a precursor of a polyelectrolyte polymer (hereinafter, also referred to as "resin precursor"), and thereafter subjecting the precursor to a hydrolysis treatment.

A PFSA resin can be obtained, for example, by hydrolyzing a PFSA resin precursor composed of a copolymer of a fluorinated vinyl ether compound represented by the following general formula (5) or (6) with a fluorinated olefin monomer represented by the following general formula (7).

$$CF_2=CF-O-(CF_2CFXO)_n\text{-A} \quad \text{Formula (5):}$$

wherein X represents F or a perfluoroalkyl group having 1 to 3 carbon atoms; n represents an integer of 0 to 5; and A represents (CF$_2$)$_m$—W, m represents an integer of 0 to 6, n and m are not 0 at the same time, and W represents a functional group capable of being converted to SO$_3$H by hydrolysis.

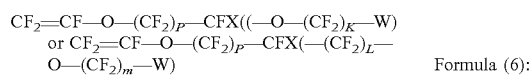
$$CF_2=CF-O-(CF_2)_P-CFX((-O-(CF_2)_K-W)$$
$$\text{or } CF_2=CF-O-(CF_2)_P-CFX(-(CF_2)_L-$$
$$O-(CF_2)_m-W) \quad \text{Formula (6):}$$

wherein X represents a perfluoroalkyl group having 1 to 3 carbon atoms; P represents an integer of 0 to 12; K represents an integer of 1 to 5; L represents an integer of 1 to 5 (with the proviso that L, K, and m are not 0 at the same time); m represents an integer of 0 to 6; and W represents a functional group capable of being converted to SO$_3$H by hydrolysis.

$$CF_2=CFZ \quad \text{Formula (7):}$$

wherein Z represents H, Cl, F, a perfluoroalkyl group having 1 to 3 carbon atoms, or a cyclic perfluoroalkyl group which may contain oxygen.

W denoting a functional group capable of being converted to $SO_3H$ by hydrolysis in the above formula (5) is not especially limited, but is preferably $SO_2F$, $SO_2Cl$, or $SO_2Br$. Further in the above formulae, $X=CF_3$, $W=SO_2F$, and $Z=F$ are more preferable. Particularly, n=0, m=an integer of 1 to 6, $X=CF_3$, $W=SO_2F$, and $Z=F$ are especially preferable because of giving tendencies of providing high hydrophilicity and a solution having a high resin concentration.

The above resin precursor in the present embodiment can be synthesized by well-known means. The resin precursor can be produced, for example, by polymerizing a fluorinated vinyl compound having a group (ion-exchange group precursor group) capable of being converted to an ion-exchange group ($X^4$ in the formula (1)) by hydrolysis or the like in the presence of a radical generator such as a peroxide or the like, with a fluorinated olefin such as tetrafluoroethylene (TFE). The polymerization method is not especially limited, and usable methods thereof include a method (solution polymerization) of filling and dissolving and reacting the fluorinated vinyl compound or the like and a gas of the fluorinated olefin in a polymerization solvent such as a fluorine-containing hydrocarbon, to thereby carry out the polymerization, a method (bulk polymerization) of carrying out the polymerization by using the fluorinated vinyl compound itself as a polymerization solvent without using any solvent such as a fluorine-containing hydrocarbon, a method (emulsion polymerization) of filling and reacting the fluorinated vinyl compound and a gas of the fluorinated olefin by using an aqueous solution of a surfactant as a medium, to thereby carry out the polymerization, a method (emulsion polymerization) of filling and emulsifying and reacting the fluorinated vinyl compound and a gas of the fluorinated olefin in an aqueous solution of a surfactant and an emulsifying aid such as an alcohol to thereby carry out the polymerization, and a method (suspension polymerization) of filling and suspending and reacting the fluorinated vinyl compound and a gas of the fluorinated olefin in an aqueous solution of a suspension stabilizer to thereby carry out the polymerization.

In the present embodiment, any resin precursor fabricated by any polymerization method described above can be used. Any block-shape or taper-shape polymer obtained by regulating the polymerization condition such as the amount of TFE gas supplied may be used as the resin precursor.

The resin precursor may be one prepared by treating impure terminals and structurally easily-oxidizable moieties (CO group-, H-bonded moieties and the like) produced in a resin molecular structure during the polymerization reaction by a well-known method under fluorine gas to thereby fluorinate the moieties.

In the resin precursor, a part of ion-exchange group precursor groups (for example, $SO_2F$ groups) may be partially (including intermolecularly) imidized (e.g., alkylimidized).

The molecular weight of the resin precursor is not especially limited, but in terms of a value of a melt flow index (MFI) of the precursor measured according to ASTM: D1238 (measurement conditions: a temperature of 270° C. and a load of 2,160 g), is preferably 0.05 to 50 (g/10 min), more preferably 0.1 to 30 (g/10 min), and still more preferably 0.5 to 20 (g/10 min).

The shape of the resin precursor is not especially limited, but from the viewpoint of accelerating treatment rates in a hydrolysis treatment and an acid treatment described later, is preferably a pellet-shape of 0.5 $cm^3$ or smaller, a disperse liquid or a powdery particle-shape; and among these, powdery bodies after the polymerization are preferably used. From the viewpoint of the costs, an extruded film-shape resin precursor may be used.

A method for producing a fluorine-based polyelectrolyte polymer of the present embodiment from the resin precursor is not especially limited, and examples thereof include a method in which the resin precursor is extruded through a nozzle, a die, or the like by using an extruder, and thereafter is subjected to a hydrolysis treatment, and a method in which the resin precursor product as it is on the polymerization, that is, a disperse-liquid product, or a product made powdery by precipitation and filtration is thereafter subjected to a hydrolysis treatment.

A method for producing a fluorine-based polyelectrolyte polymer of the present embodiment from the resin precursor is not especially limited, and examples thereof include a method in which the resin precursor is extruded through a nozzle, a die, or the like by using an extruder, and thereafter is subjected to a hydrolysis treatment, and a method in which the resin precursor product as it is on the polymerization, that is, a disperse-liquid product, or a product made powdery by precipitation and filtration is thereafter subjected to a hydrolysis treatment.

More specifically, a resin precursor obtained as in the above, and as required, molded is then immersed in a basic reaction liquid to be thereby subjected to a hydrolysis treatment. The basic reaction liquid used in the hydrolysis treatment is not especially limited, but preferable are an aqueous solution of an amine compound such as dimethylamine, diethyleamine, monomethylamine, or monoethylamine, and an aqueous solution of a hydroxide of an alkali metal or an alkaline earth metal; and especially preferable are aqueous solutions of sodium hydroxide and potassium hydroxide. In the case of using a hydroxide of an alkali metal or an alkaline earth metal, the content thereof is not especially limited, but preferably 10 to 30% by mass with respect to the whole of a reaction liquid. The reaction liquid more preferably further contains a swelling organic compound such as methyl alcohol, ethyl alcohol, acetone, and dimethyl sulfoxide (DMSO). The content of a swelling organic compound is preferably 1 to 30% by mass with respect to the whole of the reaction liquid.

The resin precursor is subjected to a hydrolysis treatment in the basic reaction liquid, thereafter sufficiently washed with warm water or the like, and thereafter subjected to an acid treatment. An acid used in the acid treatment is not especially limited, but is preferably a mineral acid such as hydrochloric acid, sulfuric acid, or nitric acid, or an organic acid such as oxalic acid, acetic acid, formic acid, or trifluoroacetic acid, and more preferably a mixture of these acids and water. The above acids may be used singly or in combinations of two or more. A basic reaction liquid used in the hydrolysis treatment may be removed by a treatment with a cation-exchange resin or the like previously before the acid treatment.

An ion-exchange group precursor group of a resin precursor is protonated by an acid treatment to thereby produce an ion-exchange group. For example, in the case of a PFSA resin precursor produced by using the above formula (5), W in the formula (5) is protonated by an acid treatment to thereby make $SO_3H$. A fluorine-based polyelectrolyte polymer obtained by the hydrolysis treatment and acid treatment is enabled to be dispersed or dissolved in a protonic organic solvent, water, or a mixed solvent of the both.

(Ion-Exchange Resin Composition)

The content of a fluorine-based polyelectrolyte polymer having a structure represented by the above formula (1) contained in an ion-exchange resin composition forming an electrolyte membrane in the present embodiment is not especially limited, but the ion-exchange resin composition preferably contains as a main component the fluorine-based polyelectrolyte polymer having the above specific structure from the viewpoint of the ion permselectivity and the oxidative deterioration resistance. Here, "containing as a main component" refers to a lower limit value of the content in the resin composition of about 33.3% by mass, preferably 40% by mass, more preferably 50% by mass, still more preferably 50% by mass, further still more preferably 80% by mass, and especially preferably 90% by mass. The upper limit value is not especially limited, but is preferably 99.5% by mass or less.

The fluorine-based polyelectrolyte polymer may be contained singly in a form of a partial salt (about 0.01 to 5 equivalent % of the equivalent of the whole ion-exchange group) with an alkali metal, an alkaline earth metal, or besides, a radical-decomposable transition metal (Ce compound, Mn compound, or the like), or in a form in concurrent use therewith of a basic polymer described later.

(Polyazole-Based Compound)

If an ion-exchange resin composition in the present embodiment comprises, in addition to the above-mentioned fluorine-based polyelectrolyte polymer, a polyazole-based compound, or comprises, in place thereof/in addition thereto, a basic polymer (including a low molecular weight substance such as an oligomer), the chemical stability (mainly oxidation resistance and the like) as the resin composition is likely to increase, which is therefore preferable. These compounds partially form ion complexes in a microparticulate form or a form near molecular dispersion in the resin composition, and form an ionically crosslinked structure. Particularly in the case where EW of a fluorine-based polyelectrolyte polymer is low (for example, in the case of 300 to 500), since the water resistance and the electric resistance are likely to become small, or the hydrous cluster diameter is likely to become low, the incorporation of a polyazole-based compound, or the incorporation, in place thereof/in addition thereto, of a basic polymer (including a low molecular weight substance such as an oligomer) in the ion-exchange resin composition is preferable from the viewpoint of the balance among the ion permselectivity and the like.

The polyazole-based compound is not especially limited, but examples thereof include one or more selected from the group consisting of polymers of a heterocyclic compound having one or more nitrogen atoms in the ring, and polymers of a heterocyclic compound having one or more nitrogen atoms and oxygen and/or sulfur in the ring. The structure of the heterocycle is not especially limited, but is preferably a five-membered ring.

The polyazole-based compound is not especially limited, but examples thereof include one or more selected from the group consisting of polyimidazole-based compounds, polybenzimidazole-based compounds, polybenzobisimidazole-based compounds, polybenzoxazole-based compounds, polyoxazole-based compounds, polythiazole-based compounds, and polybenzothiazole-based compounds. Among these, polybenzimidazole-based compounds are preferable from the viewpoint of the easiness of forming the ionic bond and the membrane strength.

The polyazole-based compound may be used which has been activated by incorporating or reacting a phosphoric acid-based compound (a single substance, a polyphosphoric acid, or the like) to bond a part thereof to the polyazole-based compound.

In the case where an ion-exchange resin composition contains a polyazole-based compound, the polyazole-based compound is preferably in a dispersed state so as not to reduce the strength of an electrolyte membrane, and more preferably dispersed in a sea-island mosaic state.

The polyazole-based compound may be present in an ionized state with various types of acids so that a part of the surface of a membrane form an ionic bond and the interior of the membrane is in an ionic (cationic) state.

That a fluorine-based polyelectrolyte polymer and a polyazole-based compound at least partially form an ionic bond is preferable from the viewpoint of the strength and the durability of an electrolyte membrane. More preferable is particularly a state in which at least a part of ion-exchange groups of a fluorine-based polyelectrolyte polymer and at least a part of a polyazole-based compound are reacted in a form near molecular dispersion (for example, a state of chemical bonding including a state in which ion complexes of acid and base are formed by ionic bonding).

Whether or not the ionic bonds are present can be checked by using a Fourier-transform infrared spectrophotometer (hereinafter, referred to as FT-IR). For example, in the case of using a perfluorocarbonsulfonic acid resin as a polyelectrolyte and poly[2,2'-(m-phenylene)-5,5'-benzimidazole] (hereinafter, referred to as "PBI") as a polyazole compound, the measurement by FT-IR allows observation of shifted absorption peaks, originated from chemical bonds of sulfonic acid groups of the polyelectrolyte with imidazole groups in the PBI, near 1,458 $cm^{-1}$, near 1,567 $cm^{-1}$, and near 1,634 $cm^{-1}$.

In the case where the fluorine-based polyelectrolyte polymer is a PFSA resin, examples of the ionic bond are not especially limited, but include a state in which sulfonic acid groups of the PFSA resin ionically bond with nitrogen atoms in the reaction groups such as an imidazole group, an oxazole group, and a thiazole group in a polyazole-based compound. If this state is controlled, diameters of cluster being ion channels formed with sulfonic acid groups of the PFSA resin with water molecules centered can be controlled. As a result, an electrolyte membrane having the excellent balance among the ion permselectivity, the water resistance, and the oxidation resistance without raising the electric resistance of the membrane can be provided without greatly sacrificing any of the mutually contradictory performances; and the performance of the electrolyte membrane can be largely improved as compared with conventional electrolyte membranes.

The content of a polyazole-based compound is, with respect to 100 parts by mass of a fluorine-based polyelectrolyte polymer having a structure represented by the above formula (1), preferably 0.1 to 200 parts by mass, more preferably 0.5 to 150 parts by mass, still more preferably 1 to 100 parts by mass, and especially preferably 1 to 50 parts by mass. The regulation of the content of a polyazole-based compound in the above range is likely to be able to provide an electrolyte membrane for a redox flow secondary battery, the electrolyte membrane having the better water resistance and strength, and the higher oxidation resistance and ion permselectivity while maintaining the better electric resistance.

(Polyphenylene Sulfide (PPS) Resin)

An ion-exchange resin composition in the present embodiment preferably further comprises a polyphenylene sulfide (PPS) resin from the viewpoint of the oxidation resistance and the cluster diameter of an electrolyte membrane.

The PPS resin can be added by a method of mixing with a resin composition containing a fluorine-based polyelectrolyte polymer by an extrusion method, or a method of mixing an aqueous solvent dispersion of the PPS resin with a stock liquid dispersion of a resin composition containing a fluorine-based polyelectrolyte polymer.

The amount of a PPS resin added is, with respect to 100 parts by mass of a fluorine-based polyelectrolyte polymer having a structure represented by the above formula (1), preferably 0.1 to 20 parts by mass, and more preferably 0.5 to 10 parts by mass. In the case where the content of a PPS resin is 0.1 parts by mass or higher, the oxidation resistance and the ion permselectivity of an electrolyte membrane are likely to be more improved; and in the case of 20 parts by mass or lower, a sufficient membrane strength is likely to be provided.

(Polyphenylene Ether Resin)

An ion-exchange resin composition in the present embodiment preferably further comprises a polyphenylene ether resin. The content of a polyphenylene ether resin is, with respect to 100 parts by mass of a fluorine-based polyelectrolyte polymer having a structure represented by the above formula (1), preferably 0.1 to 20 parts by mass, and more preferably 0.1 to 10 parts by mass. The incorporation of a polyphenylene ether resin in the above range is likely to more improve the chemical durability such as the oxidation resistance.

An ion-exchange resin composition in the present embodiment may contain fluorine-based resins (fluorine-based resins containing carboxylic acid, phosphoric acid or the like, and other well-known fluorine-based resins) other than a fluorine-based polyelectrolyte polymer represented by the formula (1). The fluorine-based resin is contained, with respect to 100 parts by mass of a fluorine-based polyelectrolyte polymer represented by the formula (1) used in the present embodiment, preferably in 30 to 50 parts by mass, more preferably in 10 to 30 parts by mass, and still more preferably 0 to 10 parts by mass.

In the case of using two or more of these resins, a mixing method is not especially limited, and may involve dissolving in a solvent or dispersing in a medium and mixing the resins, or may involve extrusion-mixing resin precursors.

<Electrolyte Membrane>

(Ion Cluster)

In an electrolyte membrane in the present embodiment, ion clusters exist.

Ion clusters existing in an electrolyte membrane in the present embodiment are composed of: hydrophobic moieties forming fluorinated hydrocarbon moieties making the main chain of a polyelectrolyte polymer molecule; moieties in which a plurality of hydrophilic groups gather (through molecules), the hydrophilic groups being ion-exchange groups positioned on the ends of side chains bonded to the main chain and having a suitable molecular structure and forming a length part thereof; and water molecules coordinated on the circumference thereof and free water (not bonding water) collected in the vicinity thereof by the hydrogen bond and other affinities.

In an electrolyte membrane in the present embodiment, a plurality of large-size channels (so-called ion clusters) and small-size ion channels connecting these are formed; and ion channels are resultantly connected continuously in the membrane thickness direction, and function as ion (particularly proton $H^+$) conduction channels.

The ion cluster diameter of an electrolyte membrane according to the present embodiment as measured in water at 25° C. by a small angle X-ray method is 1.00 to 2.95 nm, preferably 1.50 to 2.95 nm, still more preferably 1.70 to 2.95 nm, and especially preferably 2.00 to 2.75 nm. Since in an electrolyte membrane according to the present embodiment, that the ion cluster diameter is 2.95 nm or less is likely to make large ions hardly permeate the membrane, to improve the ion permselectivity, and to improve the strength of the membrane, a redox flow secondary battery using the membrane as a separation membrane is improved in the current efficiency. By contrast, that the ion cluster diameter is 1.00 nm or more makes protons (W) coordinating water molecules easily pass and reduces the electric resistance.

The number (clusters/nm$^3$) of ion clusters in an electrolyte membrane per unit volume thereof is preferably 0.06 to 0.25, more preferably 0.09 to 0.22, and still more preferably 0.12 to 0.20. The case where the number of ion clusters per unit volume is 0.25 or smaller is likely to improve the membrane strength; and the case of 0.06 or larger is likely to more improve the electric conductivity (more reduce the membrane electric resistance).

The specific calculation methods of the ion cluster diameter and the number of clusters are as follows.

An electrolyte membrane in the state of being immersed in water at 25° C. is subjected to a small angle X-ray scattering measurement, and the blank cell scattering correction and the absolute intensity correction are made on the acquired scattering profile. In the case where the measurement is carried out by using a two-dimensional detector, data are converted to one-dimensional data by rational means such as circular average to thereby determine the scattering angle dependence of the scattering intensity. By using the thus acquired scattering angle dependence of the scattering intensity (scattering profile), the cluster diameter can be determined according to means described in Yasuhiro Hashimoto, Naoki Sakamoto, Hideki Iijima, Kobunshi Ronbunshu (Japanese Journal of Polymer Science and Technology), vol. 63, No. 3, pp. 166, 2006. That is, the cluster structure is assumed to be expressed as core-shell type rigid spheres having a particle size distribution; and a region where the scattering originated from clusters in the actually measured scattering profile dominates is subjected to fitting by using a theoretical scattering formula based on this rigid sphere model to be thereby able to acquire an average cluster diameter and a density of the number of clusters. In this model, the part of a core corresponds to a cluster, and the diameter of the core makes a cluster diameter. Here, the shell layer is virtual and the electron density of the shell layer is assumed to be equal to that of the matrix part. The thickness of the shell layer is assumed to be 0.25 nm. The theoretical scattering formula of the model used for the fitting is shown as Expression 1. Here, C represents an instrument constant; N, a density of the number of clusters; η, a volume fraction of a rigid sphere in the case where a core, that is, a cluster part and a virtual shell surrounding it are assumed as the rigid sphere; θ, a Bragg angle; λ, an X-ray wavelength used; t, a shell layer thickness; $a_0$, an average cluster radius (a half of the cluster diameter); and σ, a standard deviation of a core diameter (cluster diameter). $I_b(q)$ represents a background scattering including thermal diffuse scattering, and is herein assumed to be a constant. On the fitting, among the above parameters, N, η, $a_0$, σ, and $I_b(q)$ are taken as variable parameters.

[Expression 1]

$$I_{HS}(q) = CNS(q, a_2, \eta) \int_0^\infty P(a) \left[ \frac{4\pi a^3}{3} \Phi(qa) \right]^2 da + I_b(q) \quad \text{Expression 1}$$

wherein:

$q = 4\pi \sin\theta / \lambda$ $S(q, a_2, \eta) = \dfrac{1}{1 + 24\eta[G(A)/A]}$ $G(A) = \dfrac{\alpha}{A^2}(\sin A - A\cos A) + \dfrac{\beta}{A^3}[2A\sin A + (2 - A^2)\cos A - 2] +$ $\qquad \dfrac{\gamma}{A^5}(-A^4 \cos A + 4[(3A^2 - 6)\cos A + (A^3 - 6A)\sin A + 6])$ $\alpha = (1 + 2\eta)^2 / (1 - \eta)^4$ $\beta = -6\eta(1 + \eta/2)^2 / (1 - \eta)^4$ $\gamma = 1/2\eta(1 + 2n)^2 / (1 - \eta)^4$ $A = 2qa_2$ $a_2 = a + t$ $\Phi(qa) = \dfrac{3}{(qa)^3}[\sin(qa) - (qa)\cos(qa)]$ $P(a) = \dfrac{1}{\sqrt{2\pi}\,\sigma} \exp\left[ -\dfrac{(a - a_0)^2}{2\sigma^2} \right]$ In an electrolyte membrane according to the present embodiment, the ion cluster diameter and the number of ion clusters in the electrolyte membrane can be regulated by the polymer structure, the polymer composition, the membrane production condition, and the like. For example, by reducing the EW of the polymer or regulating the heat treatment condition of the electrolyte membrane, the ion cluster diameter is likely to be improved.

(Equilibrium Moisture Content)

The equilibrium moisture content of an electrolyte membrane in the present embodiment is preferably 5% by mass or higher, more preferably 10% by mass or higher, and still more preferably 15% by mass or higher. The equilibrium moisture content of an electrolyte membrane in the present embodiment is preferably 50% by mass or lower, more preferably 50% by mass or lower, and still more preferably 40% by mass or lower. If the equilibrium moisture content of an electrolyte membrane is 5% by mass or higher, the electric resistance, the current efficiency, the oxidation resistance, and the ion permselectivity of the membrane are likely to be good. By contrast, if the equilibrium moisture content is 80% by mass or lower, the dimensional stability and the strength of the membrane are likely to be good and the increase of water-soluble components is likely to be suppressed. The equilibrium moisture content of an electrolyte membrane is expressed as an equilibrium (being left for 24 hours) saturated water absorption rate (Wc) at 23° C. and 50% relative humidity (RH), based on the membrane prepared by forming a membrane from a dispersion liquid of the resin composition with water and an alcoholic solvent, and drying the membrane at 160° C. or lower.

The membrane maximum moisture content of an electrolyte membrane in the present embodiment is not especially limited, but is, from the viewpoint of the electric resistance, the current efficiency, the oxidation resistance, and the ion permselectivity of the membrane, preferably 10% by mass or higher, more preferably 15% by mass or higher, and still more preferably 20% by mass or higher. The maximum moisture content is, from the viewpoint of the dimensional stability and the strength of the membrane, preferably 80% by mass or lower, more preferably 50% by mass or lower, and still more preferably 40% by mass or lower. Here, the membrane maximum moisture content refers to a maximum value out of water contents measured in the above equilibrium moisture content measurement.

The equilibrium moisture content of an electrolyte membrane can be regulated by the similar method as in EW described above.

(Reinforcing Material)

An electrolyte membrane in the present embodiment preferably has a reinforcing material from the viewpoint of the membrane strength. The reinforcing material is not especially limited, and includes usual nonwoven fabrics and woven cloths, and porous membranes composed of various types of materials.

The porous membrane is not especially limited; but preferable are porous membranes having the good affinity for the fluorine-based polyelectrolyte polymer, and among these, from the viewpoint of the strength of the thin membrane and the suppression of the dimensional change in the plane (vertical and horizontal) direction, more preferable are reinforcing membranes in which a PTFE-based membrane stretched and made porous is utilized and an ion-exchange resin composition comprising a fluorine-based polyelectrolyte polymer in the present embodiment is substantially voidlessly filled therein.

The reinforcing membrane can be produced by impregnating a porous membrane with a reasonable amount of a dispersion liquid with an organic solvent or an alcohol-water as a solvent containing a reasonable amount of the ion-exchange resin composition components as solutes in reasonable concentrations, and drying the impregnated porous membrane.

A solvent used in fabrication of the reinforcing membrane is not especially limited, but is preferably a solvent having a boiling point of 250° C. or lower, more preferably a solvent having a boiling point of 200° C. or lower, and still more preferably a solvent having a boiling point of 120° C. or lower. Among these, water and aliphatic alcohols are preferable, and the solvent specifically includes water, methanol, ethanol, 1-propanol, 2-propanol, 1-butanol, 2-butanol, isobutyl alcohol, and tert-butyl alcohol. The solvents may be used singly or in combinations of two or more.

(Method for Producing an Electrolyte Membrane)

A production method of an electrolyte membrane (membrane formation method) in the present embodiment is not especially limited, and a well-known extrusion method or cast membrane formation can be used. The electrolyte membrane may be of a single layer or of a multilayer (2 to 5 layers); and in the case of a multilayer, the performance of the electrolyte membrane can be improved by laminating membranes having different properties (for example, resins having different EWs and functional groups). In the case of a multilayer, the lamination may be carried out at the extrusion membrane production time or the cast time, or each membrane obtained may be laminated.

The electrolyte membrane formed by the above method is sufficiently washed with water (or, as required, before water washing, treated with an aqueous acidic liquid such as dilute hydrochloric acid, nitric acid, or sulfuric acid) to thereby remove impurities, and is preferably subjected to a heat treatment in the air or an inert gas (preferably in an inert gas) preferably at 130 to 200° C., more preferably at 140 to 180°

C., and still more preferably 150 to 170° C., for 1 to 30 min. The time of the heat treatment is more preferably 2 to 20 min, further still more preferably 3 to 15 min, and especially preferably about 5 to 10 min.

The resin in the state as it is at the time of forming the membrane is usually not sufficiently entangled among particles (among primary particles and secondary particles) and molecules originated from raw materials. The heat treatment is useful in the purpose of interparticulately and intermolecularly entangling the resin, and is particularly in stabilizing the water resistance (particularly decreasing the hot water-dissolving component ratio) and the saturated water absorption rate of water, and producing stable clusters. The heat treatment is useful also from the viewpoint of the improvement of the membrane strength. Particularly in the case of using the cast membrane formation method, the heat treatment is useful.

The heat treatment presumably contributes to the formation of clusters excellent in the water resistance and stable and provides an effect of making the cluster diameter uniform and small because of the formation of fine intermolecular crosslinking among molecules of a fluorine-based polyelectrolyte polymer.

It is further assumed that the above heat treatment causes at least a part of ion-exchange groups of a fluorine-based polyelectrolyte polymer in an ion-exchange resin composition to react with active reaction sites (aromatic rings and the like) of other additive (including resins) components to thereby form fine crosslinking through the reaction (particularly the reaction of ion-exchange groups present near the other resin components being dispersed additives) and contribute to the stabilization. The degree of the crosslinking is, in terms of EW (the degree of the EW decrease before and after the heat treatment), preferably 0.001 to 5%, more preferably 0.1 to 3%, and still more preferably about 0.2 to 2%.

Carrying out the above heat treatment under the above suitable condition (time, temperature) is preferable from the viewpoint of exhibiting the effect of the heat treatment, and from the viewpoint of suppressing the degradation of the oxidative deterioration resistance during actual usage as an electrolyte membrane, with the degradation starting from faults generated in the molecular structure due to the generation and increase of fluorine removal, hydrofluoric acid removal, sulfonic acid removal and thermally oxidized sites, and the like.

The electrolyte membranes in the present embodiments are excellent in the ion permselectivity, low in the electric resistance, and excellent also in the durability (mainly the hydroxy radical oxidation resistance), and exhibit excellent performance as a separation membrane for a redox flow secondary battery. Here, each physical property in the present specification can be measured according to methods described in the following Examples unless otherwise specified.

EXAMPLES

Then, the present embodiments will be described more specifically by way of Examples and Comparative Examples, but the present embodiments are not limited to the following Examples unless going over their gist.

[Measurement Methods]

(1) The melt flow index of a PFSA resin precursor

The melt flow index was measured according to ASTM: D1238 under the measurement conditions of a temperature of 270° C. and a load of 2,160 g.

(2) The measurement of an equivalent weight EW of a PFSA resin 0.3 g of a PFSA resin was immersed in 30 mL of a saturated NaCl aqueous solution at 25° C., and left for 30 min under stirring. Then, free protons in the saturated NaCl aqueous solution was subjected to a neutralization titration using a 0.01 N sodium hydroxide aqueous solution with phenolphthalein as an indicator. The end point of the neutralization titration was set at a pH of 7; and the PFSA resin portion, obtained after the neutralization titration, in which counter ions of ion-exchange groups were in the sodium ion state was rinsed with pure water, further dried in a pan drier at 160° C., and weighed. The amount of substance of sodium hydroxide used for the neutralization was taken as M (mmol), and the mass of the PFSA resin in which counter ions of the ion-exchange groups were in the sodium ion state was taken as W (mg); and the equivalent weight EW (g/eq) was determined from the following expression.

$$EW=(W/M)-22$$

The above operation was repeated five times; and the maximum value and the minimum value of the five calculated EW values were excluded, and the three values were arithmetically averaged to thereby determine a measurement result.

(3) the Measurements of an Equilibrium Moisture Content

A dispersion liquid of a PFSA resin was coated on a clear glass plate, dried at 150° C. for about 10 min, and peeled to thereby form a membrane of about 30 μm; the membrane was left in water at 23° C. for about 3 hours, and thereafter left in a room of a relative humidity (RH) of 50% for 24 hours; and then, the equilibrium moisture content was measured. An 80° C.-vacuum-dried membrane was used as the reference dried membrane. The equilibrium moisture content was calculated from the mass variation in the membrane.

(4) Measurement Method of a Membrane Maximum Moisture Content

The maximum moisture content is a maximum value observed in the equilibrium moisture content measurement.

(5) Measurement Methods of the Cluster Diameter and the Number of Clusters

An electrolyte membrane was immersed in water at 25° C. for 24 hours, and a point-focused X-ray was made incident on the electrolyte membrane in the state of being immersed in water from the normal direction, and transmitted scattered light was detected. The measurement used a small angle X-ray scattering measurement apparatus Nano Viewer, made by Rigaku Corp., using an incident X-ray wavelength of 0.154 nm, a camera length of 850 mm, and a measurement time of 15 min. A detector used was PILATUS 100K. The cluster diameter and the number of clusters were calculated from a scattering profile acquired from the transmitted scattered light.

(6) Charge and Discharge Test

In a redox flow secondary battery, each of liquid-permeable porous current collector electrodes (for a negative electrode and for a positive electrode) was disposed on either side of the separation membrane, and these were held by pressing; one side partitioned by the separation membrane was made a positive electrode cell chamber and the other side was made a negative electrode cell chamber; and the thicknesses of both the cell chambers were secured by spacers. Charge and discharge of the battery was carried out by circulating a positive electrode electrolyte solution composed of a sulfuric acid electrolyte solution comprising tetravalent vanadium ($V^{4+}$) and pentavalent vanadium ($V^{5+}$)

to the positive electrode cell chamber, and circulating a negative electrode electrolyte solution comprising trivalent vanadium ($V^{3+}$) and divalent vanadium ($V^{2+}$) to the negative electrode cell chamber. In the charge time therein, in the positive electrode cell chamber, vanadium ions released electrons to thereby oxidize $V^{4+}$ to $V^{5+}$; and in the negative electrode cell chamber, electrons having returned through an external circuit reduced $V^{3+}$ to $V^{2+}$. In the oxidation and reduction reactions, in the positive electrode cell chamber, protons ($H^+$) became excessive; by contrast, in the negative electrode cell chamber, protons ($H^+$) became insufficient. The excessive protons in the positive electrode cell chamber selectively migrated to the negative electrode chamber through the separation membrane to thereby hold the electric neutrality. In the discharge time, a reaction reverse thereto progressed. The battery efficiency (energy efficiency) (%) at this time is represented by a ratio (%) obtained by dividing a discharge electric energy by a charge electric energy; and both the electric energies depend on the internal resistance of the battery cells, the ion permselectivity of the separation membrane, and the current losses of others.

The current efficiency (%) is represented by a ratio (%) obtained by dividing an amount of discharge electricity by an amount of charge electricity; and both the amounts of electricity depend on the ion permselectivity of the separation membrane and current losses of others. The battery efficiency is represented by a product of the current efficiency and a voltage efficiency. Since the reduction of the internal resistance, that is, cell electric resistivity, improves the voltage efficiency (the battery efficiency (energy efficiency)) and the improvement of the ion permselectivity and the reduction of the current losses of others improve the current efficiency, these factors become important indices in the redox flow secondary battery.

A charge and discharge test was carried out using a battery thus obtained. An aqueous electrolyte solution having a whole vanadium concentration of 2 M/L and a whole sulfate ion concentration of 4 M/L was used; the thicknesses of the positive electrode cell chamber and the negative electrode cell chamber installed were each 5 mm; and a porous felt of 5 mm in thickness and about 0.1 g/cm$^3$ in bulk density composed of a carbon fiber was interposed between the separation membrane and each of both the porous electrodes. The charge and discharge test was carried out at a current density of 80 mA/cm$^2$.

The cell electric resistivity ($\Omega \cdot cm^2$) was determined by using the AC impedance method, and measuring a direct-current resistance value at an AC voltage of 10 mV at a frequency of 20 kHz at the discharge initiation time and multiplying the resistance value by the electrode area.

The cell internal resistance was determined by dividing a difference between a middle voltage in the charging and a middle voltage in the discharge in constant-current charge and discharge times, by 2, and multiplying a value (resistance) obtained by further dividing the quotient by the current value, by an electrode area.

(7) Durability

The durability was evaluated using the current efficiency (%) and the cell electric resistivity ($\Omega \cdot cm^2$) after 200 cycles of the charge and discharge of the above (6) were carried out.

Examples 1 to 8

(1) Fabrication of a PFSA Resin Precursor

A 10% aqueous solution of $C_7F_{15}COONH_4$ and pure water were charged in a stainless steel-made stirring-type autoclave, and the interior atmosphere of the autoclave was sufficiently replaced by vacuum and nitrogen; and thereafter, tetrafluoroethylene ($CF_2=CF_2$, TFE) gas was introduced, and the interior pressure was boosted up to 0.7 MPa in terms of gage pressure. Then, an ammonium persulfuric acid aqueous solution was injected to initiate the polymerization. While in order to replenish TFE consumed by the polymerization, TFE gas was continuously fed so as to hold the pressure of the autoclave at 0.7 MPa, $CF_2=CFO(CF_2)_2-SO_2F$ of an amount corresponding to 0.70 times the amount of TFE fed in mass ratio was continuously fed to carry out the polymerization by regulating the polymerization condition in a best range respectively to thereby obtain various perfluorocarbonsulfonic acid resin precursor powder. The MFI of the obtained PFSA resin precursor powder was 0.5 (g/10 min) for A1, 1.5 (g/10 min) for A2, 0.8 (g/10 min) for A3, 2.0 (g/10 min) for A4.

(2) Fabrication of PFSA Resins and Dispersion Solutions Thereof

The obtained PFSA resin precursor powder was brought into contact with an aqueous solution in which potassium hydroxide (15% by mass) and methyl alcohol (50% by mass) were dissolved at 80° C. for 20 hours to thereby subject the precursor polymer to a hydrolysis treatment. Thereafter, the precursor polymer was immersed in water at 60° C. for 5 hours. Then, such a treatment that the resultant was immersed in a 2 N hydrochloric acid aqueous solution at 60° C. for 1 hour was repeated five times by renewing the hydrochloric acid aqueous solution each time; and thereafter, the resultant was washed with ion-exchange water, and dried. A PFSA resin having a structure having sulfonic acid groups ($SO_3H$) and represented by the formula (2) (m=2) was thereby obtained. The EW of the obtained PFSA resin was 450 (g/eq) for A1, 650 (g/eq) for A2, 750 (g/eq) for A3, 850 (g/eq) for A4.

The obtained PFSA resins were each put in a 5-L autoclave together with an ethanol aqueous solution (water:ethanol=50:50 (in mass ratio)), and the autoclave was hermetically closed; and the mixture was heated up to 160° C. under stirring by a blade, and the temperature was held for 5 hours. Thereafter, the autoclave was spontaneously cooled, and a homogeneous dispersion liquid of 5% by mass of the PFSA resin was thus fabricated. Then, 100 g of pure water was added to 100 g of the PFSA resin dispersion liquid, and stirred; and thereafter while the dispersion liquid was heated to 80° C. and stirred, the dispersion liquid was concentrated up to 20% by mass in terms of solid content concentration.

The obtained PFSA resin dispersion liquids were made a dispersion liquid (ASF1), a dispersion liquid (ASF2), a dispersion liquid (ASF3), and a dispersion liquid (ASF4), in the similar order as in the above.

Then, a polybenzimidazole (PBI) powder was dissolved in an alkali aqueous solution (KOH-10% aqueous solution), and homogeneously mixed and dispersed in the above respective PFSA resin dispersion liquids under stirring so that the PBI powder finally became 6 parts by mass, 4 parts by mass, 3 parts by mass, and 1 part by mass in terms of solid component, respectively in the order of ASF1 to ASF4, with respect to 100 parts by mass of the PFSA resin component. Then, the mixtures were passed through a column packed with a particulate cation-exchange resin particle to nearly completely remove alkali ion components to thereby make mixed dispersion liquids (ASBF), in which ionic bonds between at least a part of the functional groups (sulfonic acid groups and alkaline nitrogen atoms) are formed, respectively ASBF1, ASBF2, ASBF3, and ASBF4.

(3) Fabrication of Electrolyte Membranes

The obtained dispersion liquids (ASF1 to ASF4) and the obtained mixed dispersion liquids (ASBF1 to ASBF4) were cast on a polyimide film as a carrier sheet by a well-known usual method, exposed to hot air at 120° C. (20 min) to nearly completely evaporate the solvent to dry the cast liquids to thereby obtain membranes. The membrane was further subjected to a heat treatment in a hot air atmosphere under the condition of 160° C. for 10 min to thereby obtain an electrolyte membrane of 50 μm in membrane thickness. The variation rate of EWs before and after the heat treatment of the obtained electrolyte membrane was about 0.2 to 0.3%.

The equilibrium moisture contents of the obtained electrolyte membranes of the group (I) <ASF> containing no PBI were ASF1 (19% by mass), ASF2 (12% by mass), ASF3 (9% by mass), and ASF4 (6% by mass) in the above order.

The maximum moisture contents of the electrolyte membranes in water at 25° C. for 3 hours were ASF1 (27% by mass), ASF2 (23% by mass), ASF3 (18% by mass), and ASF4 (15% by mass). Here, the maximum moisture content is a maximum value observed in the equilibrium moisture content measurement.

The equilibrium moisture contents of the electrolyte membranes of the group (II) <ASBF> containing PBI were ASBF1 (18% by mass), ASBF2 (11% by mass), ASBF3 (8% by mass), and ASBF4 (6% by mass).

The maximum moisture contents of the electrolyte membranes in water at 25° C. for 3 hours were ASBF1 (21% by mass), ASBF2 (21% by mass), ASBF3 (17% by mass), and ASBF4 (14% by mass).

From the above results, the group containing PBI was likely to exhibit better water resistance.

The cluster diameters (nm)/the number of the clusters (clusters/nm$^3$) of the electrolyte membranes after a predetermined conditioning were, for the group (I) <ASF> containing no PBI, ASF1 (2.00/0.25), ASF2 (2.50/0.15), ASF3 (2.92/0.10), and ASF4 (3.00/0.08), and for the group (II) <ASBF> containing PBI, ASBF1 (1.70/0.35), ASBF2 (2.25/0.25), ASBF3 (2.75/0.13), and ASBF4 (2.95/0.10).

From the above results, the group containing PBI was likely to exhibit the reduction of the cluster diameters and the increased number of clusters per unit volume, which were preferable tendencies. These effects are presumed to be due to ionic bonds between the added PBI and the PFSA resin.

Then, a charge and discharge test was carried out by using each electrolyte membrane as a separation membrane of a vanadium redox flow secondary battery. The charge and discharge experiments were carried out by using the group (I) <ASF> containing no PBI after the equilibrium was sufficiently reached in the electrolyte solutions; and thereafter, after the stable state was made, the cell electric resistivities and the current efficiencies were measured. The current efficiency/cell electric resistivity of the respective membranes was ASF1 (98.0/0.70), ASF2 (97.5/0.90), ASF3 (97.0/1.00), and ASF4 (96.5/1.05), which exhibited excellent tendencies.

Then, the current efficiency/the cell electric resistivity of the group (II) <ASBF> containing PBI was measured by the similar method, and was ASBF1 (98.9/0.80), ASBF2 (98.3/0.95), ASBF3 (97.8/1.05), and ASBF4 (97.2/1.10), which exhibited better tendencies.

Then, a durability test was carried out by using the membrane obtained from ASF3 and ASBF3, and carrying out 200 cycles of the charge and discharge and examining the variation. As a result, the current efficiency (O)/the cell electric resistivity (Ω·cm$^2$) was (96.5/0.98) for ASF3 and (97.7/1.02) for ASBF3, giving only a small variation and exhibiting excellent oxidation resistance.

Comparative Example 1

An electrolyte membrane was obtained in the same manner as in Example 1, except for using Nafion DE2021 (registered trademark, made by Du Pont K.K., 20% solution, EW: 1,050) in place of the 20% PFSA resin dispersion liquid used in Example 1. The equilibrium moisture content of the membrane was 4% by mass.

The cluster diameter (nm)/the number of the clusters (clusters/nm$^3$) was measured by the similar method as in the Examples using the obtained electrolyte membrane, and was 3.20/0.04, in which the cluster diameter was large, and the number of clusters per unit volume was small, which were inferior to those of the membrane in the Examples. As a result of carrying out a charge and discharge test by the similar method as in Example, the current efficiency (O)/the cell electric resistivity (Ω·cm$^2$) was 94.5/1.20, in which the current efficiency was in a very lower level than in Examples. This is presumably because the electrolyte membrane of Comparative Example 1 had a low ion permselectivity. As a result of carrying out 200 cycles of the charge and discharge as the durability test, the current efficiency was 86% and the electric resistance was 1.30, also exhibiting inferior durability.

In Table 1, the results of the above Examples 1 to 8 and Comparative Example 1 are shown.

TABLE 1

| | Polyelectrolyte | | | Additive | Polyelectrolyte Membrane | | | | |
| | | | | | | Membrane | Membrane Maximum | | |
| | Polymer Name | MFI | Equivalent Weight EW (g/eq) | Amount of PBI Added (parts by mass) | Composition | Membrane Thickness (μm) | Equilibrium Moisture Content (mass %) | Moisture Content (25° C.) (mass %) | Cluster Size (nm) | The Number of Clusters (clusters/nm$^3$) (° C.) |
|---|---|---|---|---|---|---|---|---|---|---|
| Example 1 | A1 | 0.5 | 450 | — | ASF1 | 50 | 19 | 27 | 2 | 0.25 |
| Example 2 | A2 | 1.5 | 650 | — | ASF2 | 50 | 12 | 23 | 2.5 | 0.15 |
| Example 3 | A3 | 0.8 | 750 | — | ASF3 | 50 | 9 | 18 | 2.92 | 0.1 |
| Example 4 | A4 | 2 | 850 | — | ASF4 | 50 | 6 | 15 | 2.94 | 0.08 |
| Example 5 | A1 | 0.5 | 450 | 6 | ASBF1 | 50 | 18 | 21 | 1.7 | 0.35 |
| Example 6 | A2 | 1.5 | 650 | 4 | ASBF2 | 50 | 11 | 21 | 2.25 | 0.25 |
| Example 7 | A3 | 0.8 | 750 | 3 | ASBF3 | 50 | 8 | 17 | 2.75 | 0.13 |
| Example 8 | A4 | 2 | 850 | 1 | ASBF4 | 50 | 6 | 14 | 2.95 | 0.1 |
| Comparative Example 1 | Nafion DE2021 | — | 1050 | — | 0 | 50 | 4 | — | 3.04 | 0.04 |

TABLE 1-continued

| | Membrane Thickness (μm) | Current Efficiency (%) (initial) | Cell Electric Resistivity (Ω·cm²) (initial) | Cell Internal Resistance (Ω·cm²) (initial) | Current Efficiency (%) (after 200 cycles) | Cell Electric Resistivity (Ω·cm²) (after 200 cycles) | Cell Internal Resistance (Ω·cm²) (after 200 cycles) |
|---|---|---|---|---|---|---|---|
| Example 1 | 50 | 98 | 0.70 | 0.45 | — | — | — |
| Example 2 | 50 | 97.5 | 0.90 | 0.55 | — | — | — |
| Example 3 | 50 | 97 | 1.00 | 0.60 | 96.5 | 0.98 | 0.60 |
| Example 4 | 50 | 96.5 | 1.05 | 0.70 | — | — | — |
| Example 5 | 50 | 98.9 | 0.80 | 0.60 | — | — | — |
| Example 6 | 50 | 98.3 | 0.95 | 0.75 | — | — | — |
| Example 7 | 50 | 97.8 | 1.05 | 0.85 | 97.7 | 1.02 | 0.85 |
| Example 8 | 50 | 97.2 | 1.10 | 0.90 | — | — | — |
| Comparative Example 1 | 50 | 94.5 | 1.20 | 1.10 | 86.0 | 1.30 | 1.25 |

The present application is based on Japanese Patent Application (Japanese Patent Application No. 2011-290035), filed on Dec. 28, 2011 in the Japan Patent Office, the entire content of which are hereby incorporated by reference.

INDUSTRIAL APPLICABILITY

The redox flow secondary battery according to the present invention is low in the electric resistance, high in the current efficiency, and excellent in the durability as well.

The electrolyte membrane for a redox flow secondary battery according to the present invention is excellent in the ion permselectivity, low in the electric resistance, and excellent in the durability (mainly hydroxy radical oxidation resistance) as well, and is industrially applicable as a separation membrane for a redox flow secondary battery.

REFERENCE SIGNS LIST

1 POSITIVE ELECTRODE
2 POSITIVE ELECTRODE CELL CHAMBER
3 NEGATIVE ELECTRODE
4 NEGATIVE ELECTRODE CELL CHAMBER
5 ELECTROLYTE MEMBRANE
6 ELECTROLYTIC BATH
7 POSITIVE ELECTRODE ELECTROLYTE SOLUTION TANK
8 NEGATIVE ELECTRODE ELECTROLYTE SOLUTION TANK
9 AC/DC CONVERTER
10 REDOX FLOW SECONDARY BATTERY

The invention claimed is:

1. A redox flow secondary battery comprising an electrolytic bath comprising:
a positive electrode cell chamber comprising a positive electrode composed of a carbon electrode;
a negative electrode cell chamber comprising a negative electrode composed of a carbon electrode; and
an electrolyte membrane as a separation membrane to separate the positive electrode cell chamber and the negative electrode cell chamber,
wherein the positive electrode cell chamber comprises a positive electrode electrolyte solution comprising a positive electrode active substance; and the negative electrode cell chamber comprises a negative electrode electrolyte solution comprising a negative electrode active substance;
wherein the redox flow secondary battery charges and discharges based on changes in valences of the positive electrode active substance and the negative electrode active substance in the electrolyte solutions;
wherein the electrolyte membrane comprises an ion-exchange resin composition comprising a fluorine-based polyelectrolyte polymer having a structure represented by the following formula (1):

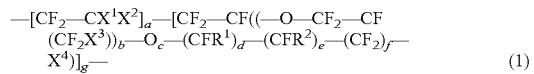
(1)

wherein $X^1$, $X^2$, and $X^3$ each independently represent one or more selected from the group consisting of halogen atoms and perfluoroalkyl groups having 1 to 3 carbon atoms; $X^4$ represents COOZ, $SO_3Z$, $PO_3Z_2$, or $PO_3HZ$ wherein Z represents a hydrogen atom, an alkali metal atom, an alkaline earth metal atom, or an amine ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \le a < 1$, $0 < g \le 1$, and a+g=1, b represents an integer of 0 to 8, c represents 0 or 1, and d, e, and f each independently represent an integer of 0 to 6 (with the proviso that d, e, and f are not 0 at the same time); and
wherein the electrolyte membrane has an ion cluster diameter of 1.00 to 2.95 nm as measured in water at 25° C. by a small angle X-ray method.

2. The redox flow secondary battery according to claim 1, wherein the positive electrode electrolyte solution and the negative electrode electrolyte solution comprise sulfuric acid and vanadium.

3. The redox flow secondary battery according to claim 1, wherein the fluorine-based polyelectrolyte polymer is a perfluorocarbonsulfonic acid resin having a structure represented by the following formula (2):

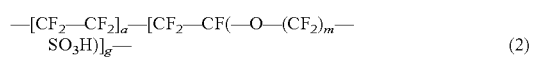
(2)

wherein a and g represent numbers satisfying $0 \le a < 1$, $0 < g \le 1$, and a+g=1; and m represents an integer of 1 to 6.

4. The redox flow secondary battery according to claim 1, wherein the fluorine-based polyelectrolyte polymer has an equivalent weight EW (dry mass in grams per equivalent of ion-exchange groups) of 300 to 1,300 g/eq; and the electrolyte membrane has an equilibrium moisture content of 5 to 80% by mass.

5. The redox flow secondary battery according to claim 1, wherein the ion-exchange resin composition comprises 0.1 to 200 parts by mass of a polyazole-based compound with respect to 100 parts by mass of the fluorine-based polyelectrolyte polymer.

6. The redox flow secondary battery according to claim 5, wherein the polyazole-based compound is one or more selected from the group consisting of polymers of a heterocyclic compound having one or more nitrogen atoms in a ring thereof, and polymers of a heterocyclic compound having one or more nitrogen atoms and oxygen and/or sulfur in a ring thereof.

7. The redox flow secondary battery according to claim 6, wherein the polyazole-based compound is one or more selected from the group consisting of polyimidazole-based compounds, polybenzimidazole-based compounds, polybenzobisimidazole-based compounds, polybenzoxazole-based compounds, polyoxazole-based compounds, polythiazole-based compounds, and polybenzothiazole-based compounds.

8. The redox flow secondary battery according to claim 5, wherein the fluorine-based polyelectrolyte polymer and the polyazole-based compound at least partially form an ionic bond therebetween.

9. The redox flow secondary battery according to claim 1, further comprising 0.1 to 20 parts by mass of a polyphenylene ether resin and/or a polyphenylene sulfide resin with respect to 100 parts by mass of the fluorine-based polyelectrolyte polymer.

10. The redox flow secondary battery according to claim 1, comprising 50 to 100 parts by mass of the fluorine-based polyelectrolyte polymer with respect to 100 parts by mass of the ion-exchange resin composition.

11. An electrolyte membrane for a redox flow secondary battery, comprising an ion-exchange resin composition comprising a fluorine-based polyelectrolyte polymer having a structure represented by the following formula (1):

—[CF$_2$—CX$^1$X$^2$]$_a$—[CF$_2$—CF((—O—CF$_2$—CF(CF$_2$X$^3$))$_b$—O$_c$—(CFR$^1$)$_d$—(CFR$^2$)$_e$—(CF$_2$)$_f$—X$^4$)]$_g$—      (1)

wherein X$^1$, X$^2$, and X$^3$ each independently represent one or more selected from the group consisting of halogen atoms and perfluoroalkyl groups having 1 to 3 carbon atoms; X$^4$ represents COOZ, SO$_3$Z, PO$_3$Z$_2$, or PO$_3$HZ wherein Z represents a hydrogen atom, an alkali metal atom, an alkaline earth metal atom, or an amine (NH$_4$, NH$_3$R$_1$, NH$_2$R$_1$R$_2$, NHR$_1$R$_2$R$_3$, NR$_1$R$_2$R$_3$R$_4$) wherein R$_1$, R$_2$, R$_3$, and R$_4$ each independently represent one or more selected from the group consisting of alkyl groups and arene groups, when X$^4$ is PO$_3$Z$_2$, Z may be identical or different; R$^1$ and R$^2$ each independently represent one or more selected from the group consisting of halogen atoms and perfluoroalkyl groups and fluorochloroalkyl groups having 1 to 10 carbon atoms; and a and g represent numbers satisfying 0≤a<1, 0<g≤1, and a+g=1, b represents an integer of 0 to 8, c represents 0 or 1, and d, e, and f each independently represent an integer of 0 to 6 (with the proviso that d, e, and f are not 0 at the same time); and wherein the electrolyte membrane has an ion cluster diameter of 1.00 to 2.95 nm as measured in water at 25° C. by a small angle X-ray method.

12. The electrolyte membrane for the redox flow secondary battery according to claim 11, wherein the fluorine-based polyelectrolyte polymer is a perfluorocarbonsulfonic acid resin having a structure represented by the following formula (2):

—[CF$_2$—CF$_2$]$_a$—[CF$_2$—CF(—O—(CF$_2$)$_m$—SO$_3$H)]$_g$—      (2)

wherein a and g represent numbers satisfying 0≤a<1, 0<g≤1, and a+g=1; and m represents an integer of 1 to 6.

13. The electrolyte membrane for the redox flow secondary battery according to claim 11, wherein the fluorine-based polyelectrolyte polymer has an equivalent weight EW (dry mass in grams per equivalent of ion-exchange groups) of 300 to 1,300; and the electrolyte membrane has an equilibrium moisture content of 5 to 80% by mass.

14. The electrolyte membrane for the redox flow secondary battery according to claim 11, wherein the ion-exchange resin composition comprises 0.1 to 200 parts by mass of a polyazole-based compound with respect to 100 parts by mass of the fluorine-based polyelectrolyte polymer.

15. The electrolyte membrane for the redox flow secondary battery according to claim 14, wherein the polyazole-based compound is one or more selected from the group consisting of polymers of a heterocyclic compound having one or more nitrogen atoms in a ring thereof, and polymers of a heterocyclic compound having one or more nitrogen atoms and oxygen and/or sulfur in a ring thereof.

16. The electrolyte membrane for the redox flow secondary battery according to claim 15, wherein the polyazole-based compound is one or more selected from the group consisting of polyimidazole-based compounds, polybenzimidazole-based compounds, polybenzobisimidazole-based compounds, polybenzoxazole-based compounds, polyoxazole-based compounds, polythiazole-based compounds, and polybenzothiazole-based compounds.

17. The electrolyte membrane for the redox flow secondary battery according to claim 14, wherein the fluorine-based polyelectrolyte polymer and the polyazole-based compound at least partially form an ionic bond therebetween.

18. The electrolyte membrane for the redox flow secondary battery according to claim 11, further comprising 0.1 to 20 parts by mass of a polyphenylene ether resin and/or a polyphenylene sulfide resin with respect to 100 parts by mass of the fluorine-based polyelectrolyte polymer.

19. The electrolyte membrane for the redox flow secondary battery according to claim 11, further comprising a reinforcing material.

20. The electrolyte membrane for the redox flow secondary battery according to claim 11, comprising 50 to 100 parts by mass of the fluorine-based polyelectrolyte polymer with respect to 100 parts by mass of the ion-exchange resin composition.

* * * * *